United States Patent [19]
Cheetham

[11] Patent Number: 5,746,644
[45] Date of Patent: May 5, 1998

[54] CENTERLESS GRINDER ASSEMBLY AND METHOD OF OPERATING THE SAME

[75] Inventor: Charles J. Cheetham, Wayne, N.J.

[73] Assignee: Royal Master Grinders, Inc., Oakland, N.J.

[21] Appl. No.: 799,399

[22] Filed: Feb. 12, 1997

Related U.S. Application Data

[60] Division of Ser. No. 635,328, Apr. 19, 1996, Pat. No. 5,674,106, which is a continuation-in-part of Ser. No. 598,549, Feb. 8, 1996, abandoned.

[51] Int. Cl.⁶ .................................................. B24B 49/00
[52] U.S. Cl. .................. 451/6; 451/5; 451/8; 451/11; 451/14; 451/49; 451/72; 451/909
[58] Field of Search ............................ 451/5, 8, 14, 72, 451/909, 11, 49, 6

[56] References Cited

U.S. PATENT DOCUMENTS

| | | |
|---|---|---|
| 4,756,126 | 7/1988 | Pozzetti et al. ........................ 451/49 |
| 5,480,342 | 1/1996 | Bannayan et al. ........................ 451/5 |
| 5,567,195 | 10/1996 | Tufts et al. ........................ 451/182 |

*Primary Examiner*—Robert A. Rose
*Assistant Examiner*—George Nguyen
*Attorney, Agent, or Firm*—Lerner, David, Littenberg, Krumholz & Mentlik

[57] ABSTRACT

A centerless grinder assembly for machining elongate workpieces and method of operating same are disclosed. The centerless grinder comprises a work wheel for removing stock from an associated workpiece, a regulating wheel arranged to cooperate with the work wheel in removing the stock from the workpiece and a support device arranged between the work wheel and a regulating wheel for supporting the workpiece during machining operations.

10 Claims, 16 Drawing Sheets

FIG. 10

WIRE SPECIFICATIONS     (c)1995 ROYAL MASTER GRINDERS, INC.

Select Part
- Part # [▽]
- TEST WIRE

Part Name
TEST WIRE TO PROVE OUT PROFILER FUNCTIONS # of Tapers
2

Paddle
No

New Part
Delete

Abort/Exit
Save/Exit

Material Specification
- Material: 303 Stainless Steel [▽]
- Wire Diameter: 0.01400 [◁▷] IN
- Wire Length: 68.250 [◁▷] IN Blade and Position
- Blade: A1-6437-4A Long [▽]
- Template
  - Used: C S-6437-C [▽]
  - Suggested: CS-6437-C Reg. Wheel Speed Selected
55 [◁▷] rpm Machine Setup
- Wire Clearance: 0.00500 [◁▷] IN
- Work Wheel: WW-419 1.5" WIDE CG1 [▽]
- Reg. Wheel: SA-836-3 1.5" WIDE A22 [▽]
- Coolant: FAR WEST SYNTHETIC [▽]

Taper or Paddle Setup
Tapers

TAPER SPECIFICATIONS  (C)1995 ROYAL MASTER GRINDERS, INC.

Part Selected: Part# TEST WIRE

Part Name: TEST WIRE TO PROVE OUT PROFILER FUN

Taper Number: 1

Start Diameter: 0.00270
Offset: 0.00000
Tolerance: + 0.00020 / − 0.00020 IN

Start Distance: 1.250
Offset: 0.000
Tolerance: + 0.050 / − 0.050 IN

End Diameter: 0.00880
Offset: 0.00000
Tolerance: + 0.00020 / − 0.00020 IN

End Distance: 1.850
Offset: 0.000
Tolerance: + 0.050 / − 0.050 IN

Diameter Differential: 0.00610
Offset: 0.00000
Tolerance: + 0.00000 / − 0.00000 IN Taper Length: 1.200
Offset: 0.000
Tolerance: + 0.000 / − 0.000 IN Abort/Exit   Save/Exit

FIG. 14

CENTERLESS GRINDER ASSEMBLY AND METHOD OF OPERATING THE SAME

This is a division of application Ser. No. 08/635,328 filed Apr. 19, 1996 U.S. Pat. No. 5,674,106, which is a CIP application Ser. No. 08/598,549 filed Feb. 8, 1996 Abandoned.

FIELD OF THE INVENTION

The present invention pertains to centerless grinders. More particularly, the present invention pertains to a centerless grinder having sensors which detect at least the position of an elongate workpiece and send signals which are processed to control the tapered configuration of the workpiece machined by the centerless grinder.

BACKGROUND OF THE INVENTION

A centerless grinder is a manufacturing machine tool which can be used to grind elongate cylindrical workpieces such as wires, rods, pins, golf club shafts and the like. The workpiece may require a constant cross-sectional diameter. Alternatively, the workpiece may require various tapered sections including slight tapered sections and abrupt diametrical changes.

The process of using a centerless grinder to machine such workpieces is also known as grinding the workpieces or removing stock from the workpiece to obtain the desired configuration. Centerless grinders are particularly useful where precision tolerances are required and where particularly accurate profiles are desirable.

Centerless grinders include three main components. A work wheel, which is also known in the art as a grinding wheel, a regulating wheel and a work rest blade. The work wheel is the machine component that usually performs the actual removal of stock from the workpiece. The work wheel thus determines the surface finish and the overall configuration of the workpiece. The surface texture of the work wheel can be varied depending upon the particular grinding operation desired.

The regulating wheel is the machine component which directs and guides the workpiece to the work wheel. The regulating wheel is also responsible for driving the workpiece and causing rotation thereof during the grinding process.

The work rest blade is the machine component which provides support for the workpiece during machining (i.e., grinding) operations. The regulating wheel will cause the workpiece to rotate on the work rest blade while the work wheel removes the amount of stock required to obtain the desired diameter or taper of the associated workpiece. Prior art work rest blades include horizontal or angled support surfaces. The particular orientation of the work rest blade surface may be selected in accordance with the required configuration of the completed workpiece.

Royal Master Grinders, Inc. of Oakland, N.J. developed a centerless grinder having photoelectric sensors which detect the position of the trailing end of the workpiece during machining operations. The detected signal is processed and causes the regulating wheel to change its position with respect to the work wheel so that the configuration of the workpiece is modified. As the trailing end of the workpiece is detected by additional sensors, further signals are generated and processed which may cause the regulating wheel to again change its position with respect to the work wheel. Accordingly, the machined workpiece may include one or more tapered sections. The tapered sections may be gradual, or abrupt, depending upon the desired configuration of the workpiece. Royal Master's aforementioned prior art centerless grinder is widely used in commercial practice.

A modified embodiment of the aforementioned centerless grinder includes independently adjustable individual sensors which can be arranged at a desired position with respect to the workpiece. Such independently adjustable individual sensors may require various adjustments in order to set the parameters of the associated centerless grinder machine to perform grinding operations which are sufficient to produce a workpiece having a customized configuration.

U.S. Pat. No. 5,480,342 discloses a control system which controls the position of a movable regulating wheel of a centerless grinder. The control system includes a sensor which measures the feed rate at which the workpiece is fed between the regulating wheel and the work wheel. The rate of movement of the regulating wheel is adjusted based on the continuously calculated position and feed rate of the workpiece during the machining process. This prior art centerless grinder is deficient because it is not versatile for use with workpieces of various lengths. In particular, the aforementioned centerless grinder may not be able to properly grind workpieces which are of a length that the trailing end of the workpiece is positioned behind all of the sensors during the grinding process. Thus, the sensors are not be able to detect movement of the workpiece at the required locations.

SUMMARY AND OBJECTS OF THE INVENTION

The present invention overcomes the shortcomings of prior art centerless grinders by providing a novel centerless grinder which has the versatility to machine workpieces having various lengths. The centerless grinder of the present invention can machine a wide variety of elongated workpieces, such as wires (e.g., wires used for heart catheterization), rods, pins, golf club shafts, etc.

The centerless grinder of the present invention comprises a work wheel for removing stock from a workpiece, and a regulating wheel arranged to cooperate with the work wheel in removing the stock from the workpiece. Support means are arranged between the work wheel and the regulating wheel for supporting the workpiece during machining operations. The centerless grinder also includes a slidable sensor bank which has a plurality of sensors spaced from the work wheel and the regulating wheel for detecting at least the position of the workpiece during machining operations and for generating signals which correspond to the detected position of the workpiece. The slidable sensor bank is electively adjustable to a desired distance away from the work wheel and the regulating wheel to permit versatility in machining workpieces having various lengths. The centerless grinder also includes processing means coupled to the plurality of sensors for processing the signals generated upon detection of the workpiece, and for transmitting the processed signals to effect desired movement of the regulating wheel, whereby a desired taper of the workpiece profile is obtained.

The centerless grinder may also comprise track means for guiding travel of the slidable sensor bank substantially parallel to the path of travel of the workpiece. In a preferred embodiment, the track means may comprise an elongate T-shaped track.

The regulating wheel may be moved closer and further from the work wheel as required to produce the desired taper or diameter of the workpiece. The desired distance between the work wheel and the regulating wheel may be defined as the sizing feature, which is the distance between the work wheel and the regulating wheel required to machine the workpiece to a desired diameter.

A slidable sensor bank is preferably mounted on the track means for slidable movement therealong. In one preferred embodiment, the slidable sensor bank may include at least one roller bearing assembly arranged adjacent to the track means to facilitate selective slidable movement of the slidable sensor bank along the track means.

The plurality of sensors of the slidable sensor bank are preferably arranged at a fixed position with respect to each other along the sensor bank. The sensors are preferably simultaneously movable as a group along the track means upon adjustment of the desired distance of the sensor bank from the sizing feature.

In a preferred embodiment, the centerless grinder comprises locking means for selectively locking the slidable sensor bank at a desired location on the track means. The locking means may comprise the combination of a plurality of retaining holes arranged in the track means spaced at predetermined distances from the sizing feature, and at least one locking pin arranged on the slidable sensor bank. The locking pin may be selectively movable from a locked position where it is arranged within a selected one of the plurality of retaining holes, and an unlocked position where it is remote from the associated retaining hole.

In a preferred embodiment, the support means for supporting the workpiece during machining operations may comprise a work rest blade. The work rest blade may have a substantially horizontal supporting surface, or may be arranged at an offset angle with respect to the horizontal plane. The orientation of the support surface of the work rest blade may determine the profile of the machined workpiece.

The plurality of sensors may comprise photoelectric sensors. The photoelectric sensors may be spaced at various intervals along the slidable sensor bank. In one preferred embodiment where the slidable sensor bank is approximately thirty two inches long, photoelectric sensors may be arranged at ½ inch intervals. In another preferred embodiment, the photoelectric sensors may be arranged at ¼ inch intervals. In alternative embodiments, the sensors may be ccd (change coupled device) sensors, proximity sensors, inductive coupling sensors, magnetic sensing devices and various other types of sensors.

The slidable sensor bank is preferably mounted on an elongate T-shaped track which has a substantially horizontal top section and a substantially vertical bottom section. Preferably, the slidable sensor bank is mounted on the top section of the track for selective slidable movement therealong. The substantially vertical bottom section of the T-shaped track may include indicia for identifying predetermined distances from the sizing feature.

The centerless grinder of the present invention may include means for feeding the elongate workpiece to a desired location between the work wheel and the regulating wheel. These means may comprise cooperating pinch rollers and a drive assembly for driving the cooperating pinch rollers.

The centerless grinder may also comprise workpiece retainer means for retaining the workpiece within a passageway during machining operations. The passageway should be large enough to permit the workpiece to rotate during machining operations. The passageway should be small enough, however, to assure that the workpiece will remain detectable by the associated sensors over its entire path of travel.

The workpiece retainer means preferably comprises an elongate retainer member which is controlled by an associated actuator. The actuator may be a cylinder or the like which is pneumatically controlled, hydraulically controlled or mechanically controlled. In assembled position, the retainer may be arranged substantially adjacent to a top section of the slidable sensor bank.

Another aspect of the present invention pertains to a method of forming a passageway which is adapted to retain a workpiece during machining operations wherein the passageway has precise dimensions. The method in accordance with this aspect of the present invention contemplates using one or more micrometers to adjust the position of the workpiece retainer and to adjust the top section of the slidable sensor bank. One or both of these components may be adjusted.

In a preferred embodiment of the present invention, the elongate workpiece retainer and the top section of the slidable sensor bank are displaceable with respect to each other so that a precise passageway can be formed in which the workpiece is arranged during machining operations. The elongate retainer and the adjustable top section of the slidable sensor bank may have cooperating ribs and grooves. To this end, the ribs may be arranged on one surface of the retainer while the adjustable top section of the slidable sensor bank may have grooves arranged in alignment with the ribs of the retainer so that the ribs of the retainer can be placed within the grooves of the adjustable top section of the slidable sensor bank when these parts are in assembled position. Conversely, the ribs may be arranged on the top section of the slidable sensor bank while the aligned grooves may be arranged on the retainer. This aspect of the present invention will permit the passageway in which the workpiece is placed during machining operations to be adjusted through a range of dimensions depending upon the size of the workpiece to be machined. At the same time, this arrangement will allow an additional workpiece to be retained in a temporary holding location while another workpiece is being machined.

The passageway for placement of the workpiece during machining operations may be enclosed along substantially the entire length of the workpiece. This preferred embodiment of the present invention permits a workpiece to be retained for accurate detection by the plurality of sensors arranged on the associated sensor bank.

In accordance with a preferred method of operating the present centerless grinder assembly, the ideal size dimensions and configuration of a perfectly machined workpiece are entered into the memory of a computer system prior to beginning machining operations. A workpiece is then placed within the passageway of the sensor bank assembly and the first machining run is performed. After the workpiece has been machined to its desired configuration, it is fed through a gauging device which accurately measures all dimensions of the profile of the completed workpiece. The information obtained by the gauging device is electrically transmitted to the computer system and is compared with the ideal dimensions of the completed workpiece which was entered into the computer memory prior to initiation of the machining process. The computer system detects any deviation between the configuration of the completed workpiece and the ideal configuration which was previously inputted into the computer memory. Unless the profile of the first machined workpiece is exactly identical to the dimensions of the ideal profile, the computer system will send signals to a size control stepper motor or servo motor during machining of the next workpiece to create a workpiece having a profile which is closer to the ideal profile than the profile of the first machined workpiece. This is accomplished as the computer system sends signals to the size control stepper motor or servo motor which requires the regulating wheel to either move closer or further from the work wheel, or to move toward or away from the work wheel at a faster or slower rate so that precise constant diameter sections and tapered sections can be obtained on the next machined workpiece. The centerless grinder assembly in accordance with this aspect of the present invention may best be considered a "smart" system as it learns from any machining errors which may have previously been made.

The first workpiece machined in accordance with the aforementioned method, and all subsequent machined workpieces, are obtained by assuming a feed rate for the workpiece while the position of the trailing end of the workpiece is continuously detected by photoelectric sensors. If any deviation is detected between the first machined workpiece, or subsequently machined workpieces, and the ideal profile which was initially entered into the memory of the computer system, compensation will be obtained by control signals sent to the regulating wheel which affect the amount of movement and rate of movement of this wheel throughout the grinding process with respect to the work wheel. This compensation may include recalculating the assumed feed rate of the workpiece as a function of this deviation.

Although an assumed feed rate of the workpiece is used in connection with preferred embodiments of the present invention, it should be appreciated that the feed rate of the workpiece may be an actual measured feed rate while remaining within the scope of the present invention.

An alternative preferred method of operating the present centerless grinder assembly incorporates various steps of the preferred method discussed above. To this end, the ideal workpiece profile dimensions are determined prior to beginning machining operations and data representative of such ideal profile dimensions are inputted into a computer readable memory associated with the centerless grinder assembly. An elongate workpiece having a trailing end is then placed at a desired location on the centerless grinder assembly to be fed past a plurality of sensors and a work wheel during machining operations. Ideal position data is then determined which includes the desired position of the regulating wheel with respect to the work wheel of the centerless grinder assembly, and the corresponding position of the trailing end of the elongate workpiece with respect to the work wheel (or more precisely the sizing feature of the work wheel). The ideal position data is then inputted into the computer readable memory. The elongate workpiece is fed past the plurality of sensors and the work wheel at a known velocity. This velocity may be an assumed velocity, or a measured velocity, so that an actual machined workpiece profile is obtained. The position of the trailing end of the workpiece with respect to the work wheel is continuously detected as it passes the plurality of sensors. The continuously detected positioned data is then converted into digital signals and is transmitted into the computer system. The actual position of the regulating wheel with respect to the work wheel is also continuously monitored and detected in correspondence with the continuous detection of the trailing end of the workpiece with respect to the work wheel. The continuously detected position data of the trailing end of the workpiece, and the regulating wheel with respect to the work wheel, are compared to the ideal position data to ascertain deviations therebetween. Deviation signals are then generated which represent the deviation between the continuously detected position data and the ideal position data of the trailing end of the workpiece and the regulating wheel with respect to the work wheel. The deviation signals are then transmitted to motor means for effecting movement of the regulating wheel closer to or further from the work wheel so that the actual machined workpiece profile will improve.

The step of continuously detecting the position of the trailing end of the workpiece with respect to the work wheel in accordance with this alternative preferred method may comprise activating and initiating a clock each time that the trailing end of the workpiece is detected by one of the plurality of sensors. The estimated or actual position of the trailing end of the workpiece between successive ones of the plurality of sensors is then calculated by multiplying the elapsed time of the clock by the known velocity of the workpiece. Such calculations will permit a relatively large sample of calculated or detected position data of the trailing end of the workpiece with respect to the work wheel, and the regulating wheel with respect to the work wheel, to be compared to the ideal position data so that an accurate machined workpiece profile can be obtained.

In accordance with this alternative method of operating a centerless grinder assembly, it is preferable to measure the dimensions along the profile of the actual machined workpiece as discussed above and to perform the aforementioned steps associated with comparing the measured dimensions to ideal inputted workpiece dimensions so that the profile of the next workpiece to be machined will be at least as close to the inputted ideal workpiece profile as the previously machined workpiece.

Still another aspect of the present invention includes the use of the WINDOWS based operating system with a general purpose computer to control an associated centerless grinding machine. The WINDOWS format machine control may vary in alternative embodiments. In a preferred embodiment, operator interface screens are provided which may include a main operating screen, a wire specifications screen, various taper specifications screens, a paddle specifications screen, a wire set-up control screen, a sizing control screen, a motor control screen, a gauging screen, a machine calibration screen and a library back up screen.

It is an object of the present invention to provide a centerless grinder which has the versatility to machine workpieces having a large range of lengths.

It is still another aspect of the present invention to provide a novel method of obtaining an accurate passageway within a centerless grinder to retain a workpiece during machining operations.

It is yet another aspect of the present invention to provide a method of controlling a centerless grinder which utilizes a WINDOWS based operating system on a general purpose computer to control machining operations of elongate workpieces such as wires, rods, pins, golf club shafts, and the like.

It is another object of the present invention to provide a simple method of controlling a centerless grinder wherein precisely manufactured workpieces are obtained.

These and other objects, features and advantages of the present invention will be more readily understood when read in conjunction with the following detailed description of the preferred embodiments and the accompanying drawings.

BRIEF DESCRIPTION OF THE DRAWINGS

FIG. 10 is a wire specifications screen created on a WINDOWS based operating system in accordance with a method of operating the present centerless grinder.

FIG. 11 is a loader control screen created on a WINDOWS based operating system in accordance with a method of operating the present centerless grinder.

FIG. 13 is a taper specification screen created on a WINDOWS based operating system in accordance with a method of operating the present centerless grinder.

FIG. 14 is a paddle specification screen created on a WINDOWS based operating system in accordance with a method of operating the present centerless grinder.

DETAILED DESCRIPTION OF THE PREFERRED EMBODIMENTS

Figure 1:
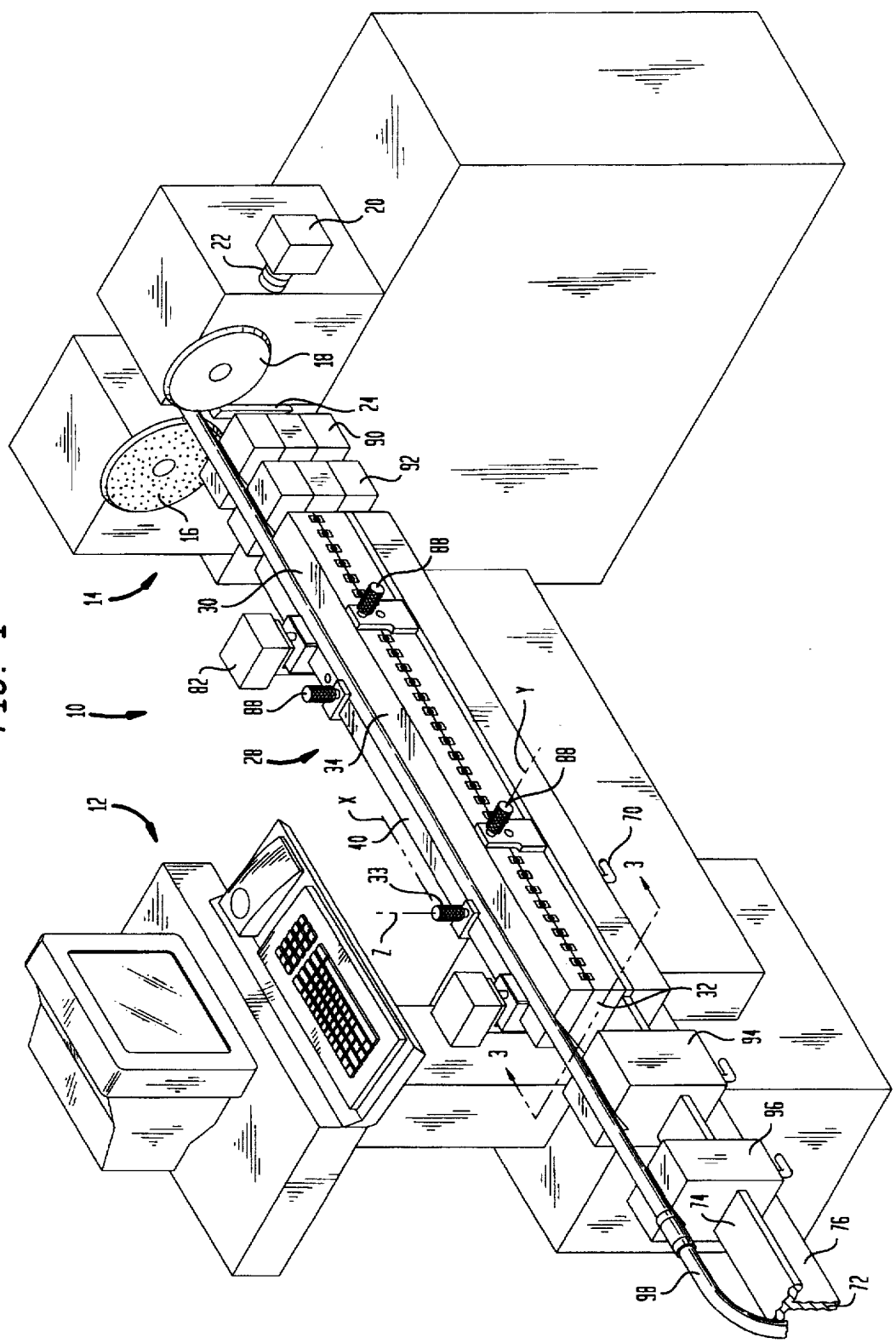
FIG. 1 is a perspective view of a centerless grinder system in accordance with the present invention.

A centerless grinder assembly 10 in accordance with a preferred embodiment of the present invention is illustrated in FIG. 1. The centerless grinder assembly 10 generally includes a computer system 12, a slidable sensor bank assembly 28 and a grinding assembly 14.

The computer system 12 may comprise a general purpose computer such as a personal computer having a 486 based microprocessor and sufficient memory to permit operation of the required software programs. The computer system 12 includes a monitor for displaying operator interface screens generated by a WINDOWS based operating system. Preferred operator interface screens in accordance with the present invention will be discussed in detail below and are shown in FIGS. 9–15. The use of a WINDOWS based operating system to provide a user friendly operator interface environment is novel in the centerless grinder art.

The centerless grinder assembly 10 is preferably used to grind elongate workpieces. By way of example, in describing the structure and operation of the present centerless grinder assembly 10, a wire 48 is discussed herein as a preferred elongate workpiece. However, it should be understood that the present centerless grinder assembly can be used to machine an infinite variety of elongate workpieces other than wires, such as rods, pins, golf club shafts, etc.

Figure 8:
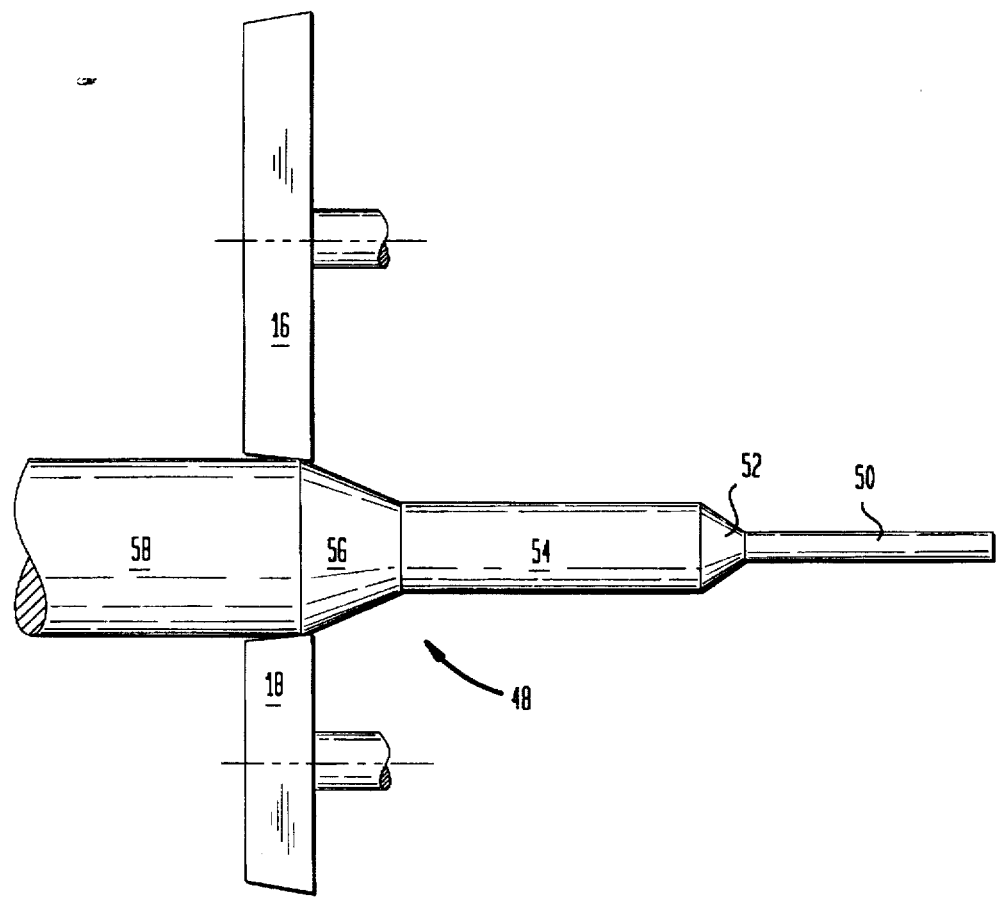
FIG. 8 is a top plan view of the combination of components shown in FIG. 7.
Figure 9:
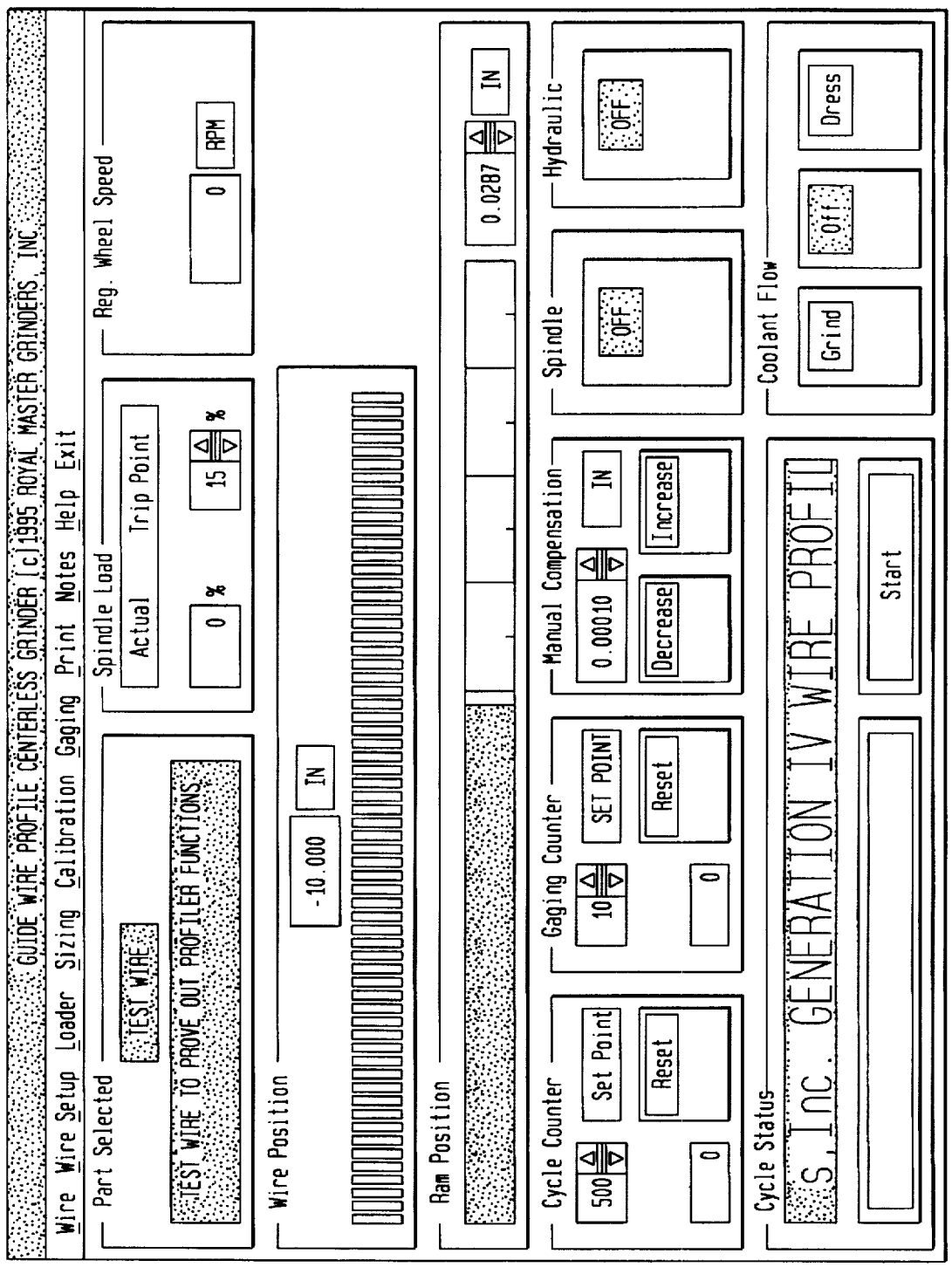
FIG. 9 is a main operating screen created on a WINDOWS based operating system in accordance with a method of operating the present centerless grinder.

As illustrated in FIGS. 1, 8 and 9, the grinding assembly 14 includes a work wheel 16 and a regulating wheel 18. The work wheel 16 is known in the art and, in a preferred embodiment, may comprise a twelve inch diameter grinding wheel. The regulating wheel 18 is also known in the art. In a preferred embodiment, it may have a diameter of about six inches. A lead screw 22 and a precision stepping motor 20 may be used to selectively drive the regulating wheel 18 toward or away from the work wheel 16.

A work rest blade 24 is arranged between the work wheel 16 and the regulating wheel 18 for supporting the workpiece 48 during machining operations. The support surface 26 of the work rest blade 24 may be horizontally oriented, or it may be oriented at an angle with respect to the horizontal plane as shown in FIG. 9. The angle of the work rest blade support surface 26 will affect the overall orientation of the machined workpiece 48.

The slidable sensor bank assembly 28 is shown in a fully assembled state in FIG. 1. Various components of the slidable sensor bank assembly 28 are shown in FIGS. 1–4 and 6.

As shown in FIGS. 1–4 and 6, the sensor bank assembly 28 includes a front end 30 and a rear end 32 with respect to the grinding assembly 14. The components of the sensor bank assembly 28 include an adjustable top section 34 which has a slanted surface 36 with a plurality of grooves 38 arranged therein. An elongate retainer bar having a slanted bottom surface 42 with ribs 44 protruding therefrom is arranged adjacent to the top section 34 when in assembled position. The ribs 44 of the elongate retainer member entered into aligned grooves 38 of the slanted surface 36 of the top section 34 to provide an adjustable fitted arrangement as discussed further below. This aspect of the present invention is clearly shown in FIG. 6.

Figure 3B:
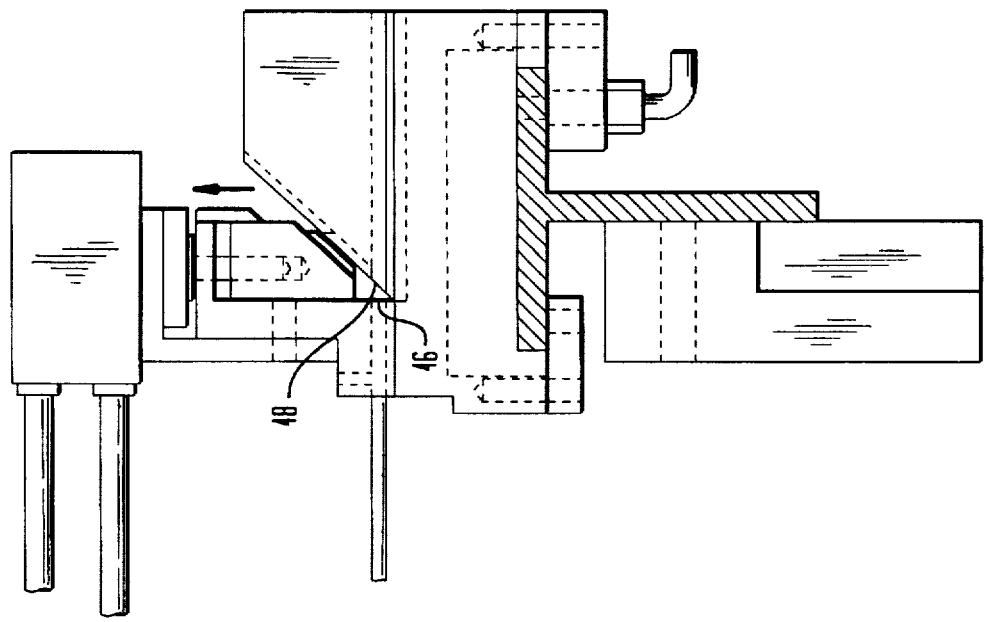
FIG. 3B is a partial sectional side view of the centerless grinder assembly shown in FIG. 3A illustrating the retainer bar in an open position with respect to the top section of the slidable sensor bank.
Figure 3A:
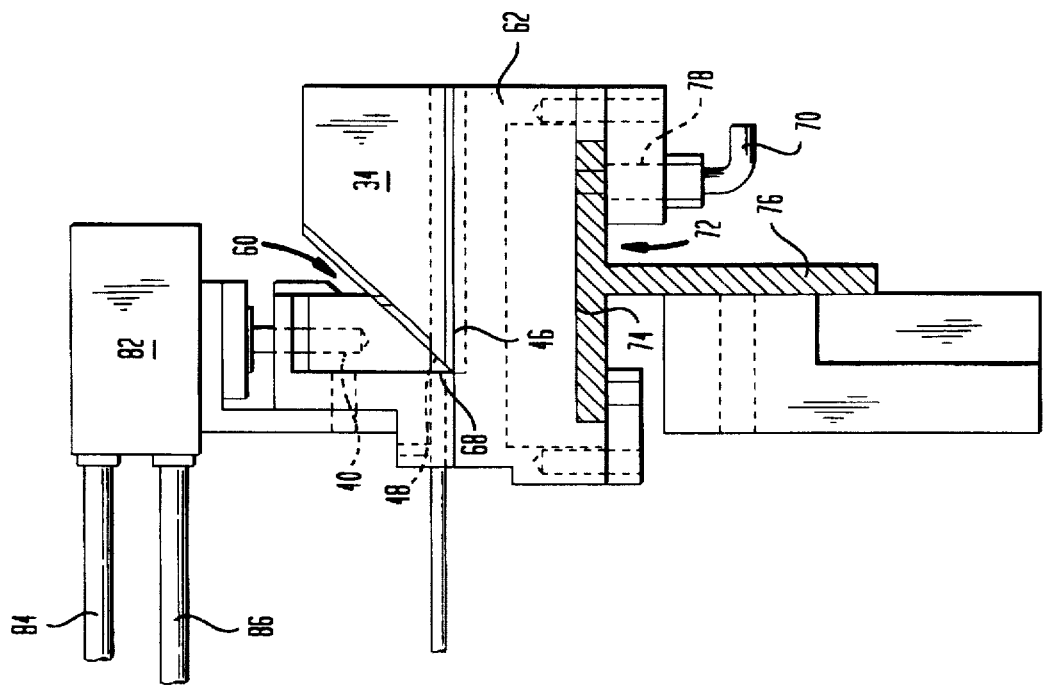
FIG. 3A is a partial sectional side view of the centerless grinder assembly of the present invention taken along line 3—3 illustrating the retainer bar in a closed position with respect to the top section of the slidable sensor bank.

A passageway 46 for retaining a workpiece 48 during machining operations is formed between the elongate retainer bar 40 and the adjustable top section as illustrated in FIGS. 3A–3B. The retainer bar 40 preferably has a plurality of ribs 44 extending along a slanted surface 42. The adjustable top section 34 of the sensor bank assembly 28 preferably has corresponding grooves 38 which extend within the slanted surface 36 and which are aligned with the ribs of the retainer bar 40. The cooperation between the ribs 44 of the retainer bar 40 and the grooves 38 of the top section 34 of the sensor bank assembly 28 permit a relatively large range of passageway dimensions to be formed for retaining various sized workpieces. The cooperating rib and groove arrangement is also useful for retaining an additional work piece to be machined in a holding area 47 spaced from the formed passageway 46. This aspect of the present invention can be appreciated from the illustrations shown in FIGS. 3A and 3B.

In a preferred embodiment, the retaining bar 40 is also adjustable. Adjustments of the top section 34 of the sensor bank assembly 28 and the retainer bar 40 may be performed along orthogonal Y and Z axes with one or more micrometers 88 in accordance with the orientation of the Y and Z axes depicted in FIG. 1. This will permit the formation of the workpiece passageway 46 which has precisely determined dimensions. For example, if the centerless grinder assembly 10 is used to grind a workpiece 48 which has an initial constant diameter of 0.016 inch, it may be desirable to use micrometers 88 to adjust the top section 34 of the sensor bank assembly 28 and the retainer bar 40 so that the passageway 46 has a diameter of about 0.018 inch. The relationship between the size of the passageway 46 and the workpiece 48 is clearly shown in FIG. 3.

The micrometers 88 may be removed after the desired adjustments of the top section 34 and the retainer bar 40 of the sensor bank assembly 28 have been performed.

The sensor bank assembly 28 includes a plurality of photoelectric sensors 68 which are adapted to detect at least the position of an associated workpiece 48 during the machining process. The photoelectric sensors 68 are placed at predetermined intervals along the sensor bank assembly 28 for optical communication with a workpiece 48 arranged within the passageway 46. Various types of known sensors are suitable for use in accordance with the present invention. One preferred type of sensor is a photoelectric sensors which is manufactured by Keyence Company. Such photoelectric sensors are well known in the optical sensing art.

In one preferred embodiment, the slidable sensor bank assembly 28 may be about thirty two inches long. The photoelectric sensors 68 may be placed at ½ inch or ¼ inch intervals. In alternative embodiments, different intervals may be selected for placement of the photoelectric sensors. Similarly, the length of the sensor bank assembly may also vary in alternative embodiments.

Pneumatically actuated devices 82 are coupled to the retainer bar 40 for selectively moving the retainer bar 40 between an open and a closed position. The pneumatic actuators 82 include an air intake tube 84 and a discharge tube 86 which supplies the driving force for vertical displacement of the retainer bar 40. When the retainer bar 40 is in a closed position as shown in FIG. 3A, the ribs 44 on the slanted surface 42 are arranged within the grooves 38 of the slanted surface 36 on the top section 34. Thus, the retainer bar 40 is substantially adjacent to the adjustable top section 34 of the retainer. The passageway 46 for retaining the workpieces 48 is formed when the retainer bar 40 is in its closed position as indicated in FIG. 3A. When the retainer bar 40 is in an open position as shown in FIG. 3B, the ribs 44 are no longer within corresponding grooves 38. The retainer bar is then remote from the adjustable top section 34 of the sensor bank assembly 28.

The slidable sensor bank assembly 28, including the adjustable top section 34 and a retainer bar 40, is mounted for selectively adjustable slidable movement on a top surface 74 of a T-shaped support track 72. This aspect of the present invention is shown in FIGS. 1-4.

The distance between the work wheel 16 and the regulating wheel 18 which is required to obtain a desired diameter at a location along the workpiece 46 is known as the sizing feature. The T-shaped support track 72 includes a substantially horizontal top section 74 and a substantially vertical bottom section 76. Indicia 80, which represent the horizontal distance perpendicular from the sizing feature, are arranged at precise intervals along the substantially vertical bottom section 76 of the T-shaped track 72.

The purpose of the marking indicia 80 is to identify the distance between the trailing end of the workpiece 48 and the sizing feature during machining operations. The marking indicia 80 are also useful for adjusting the slidable sensor bank assembly 28 to a selected location based on the length of a workpiece 48 that will be machined. Since the photoelectric sensors 68 detect the trailing end of the workpiece 48, it is important for the slidable sensor bank assembly 28 to be placed at a suitable location along the T-shaped track 72 such that the photoelectric sensors 68 can detect the trailing end of the workpiece 48 during the entire period that grinding occurs on the opposite end of the workpiece.

Figure 2:
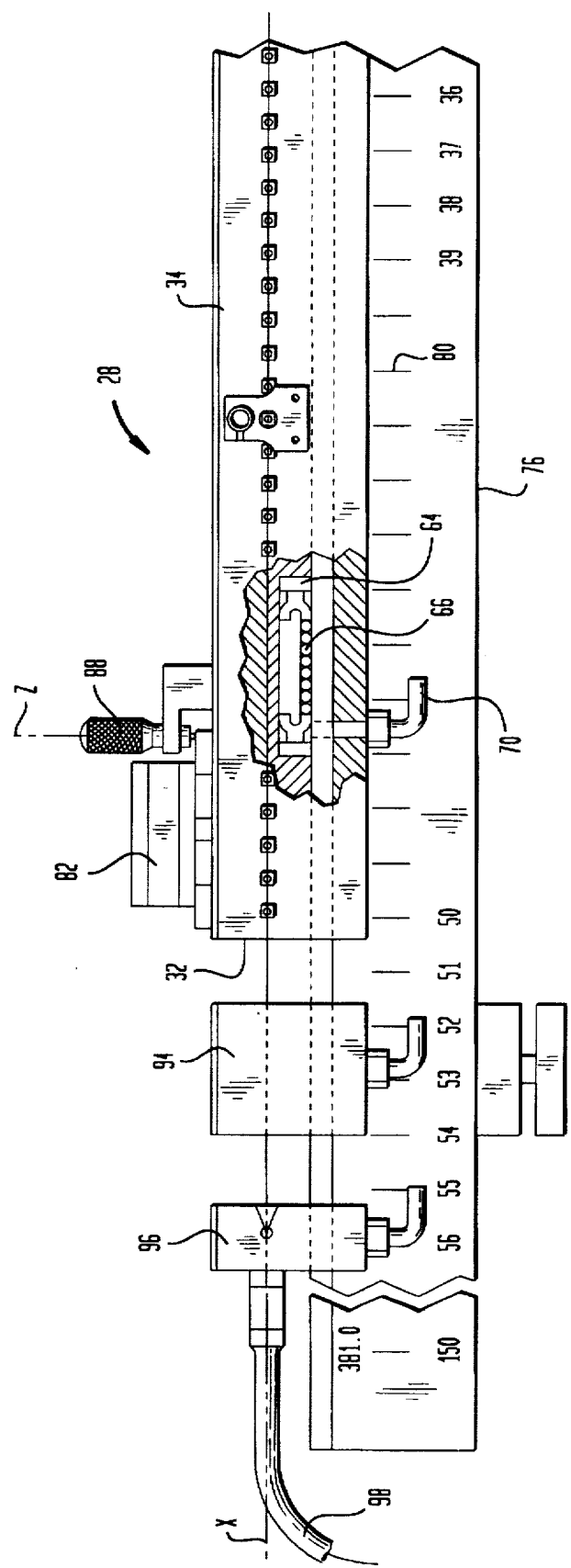
FIG. 2 is a partially broken away front view of a portion of a slidable sensor bank assembly in accordance with the present invention illustrating roller bearings which facilitate slidable movement of the present sensor bank.

The sensor bank assembly 28 is slidably adjustable along the top section of the T-shaped track 72 as it includes roller bearing assemblies 66 arranged within recessed pocket areas 64 toward the front end 30 and the rear end 32 of the sensor bank assembly 28. This aspect of the present invention is shown in FIG. 2.

Figure 6:
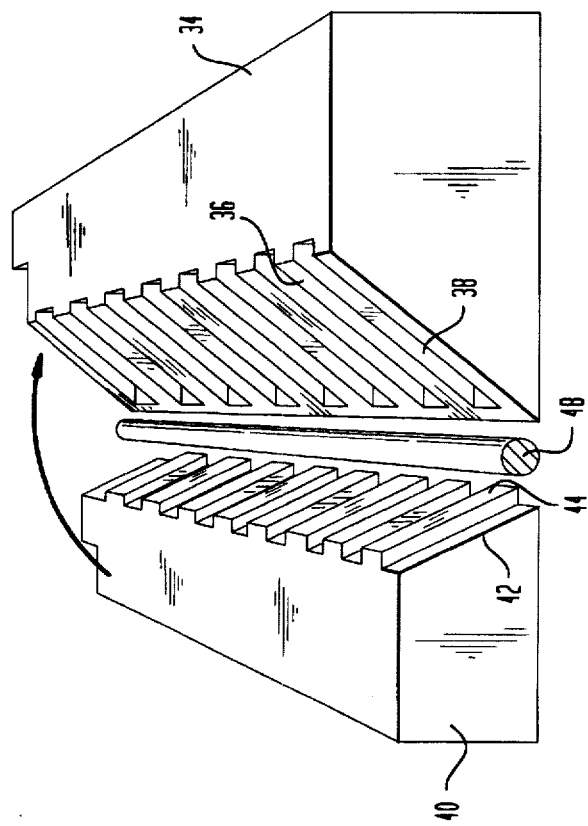
FIG. 6 is an exploded isolated perspective view of selected components of the slidable sensor bank assembly illustrating the cooperating ribs and grooves of such components.

As illustrated in FIG. 6, one side of the top section 74 of the T-shaped track 72 includes spaced holes 78 which serve as part of the locking means of the present invention for selectively locking the slidable sensor bank assembly 28 in a desired position. The other portion of the locking means is a locator pin 70 which is arranged at the bottom section 62 of the slidable sensor bank assembly 28. The locator pin 70 can be aligned with any of the holes 78 in the top section 74 of the T-shaped track 72. When the locator pin 70 is extended through a selected aligned hole 78 as shown in FIGS. 2, 3A and 3B, the sensor bank assembly 28 is arranged in a fixed position. Conversely, when the locator pin 70 is pulled out of its assembled position within one of the holes 78, the sensor bank can slide along the T-shaped track 72 parallel to the x axis illustrated in FIG. 1.

Figure 4:
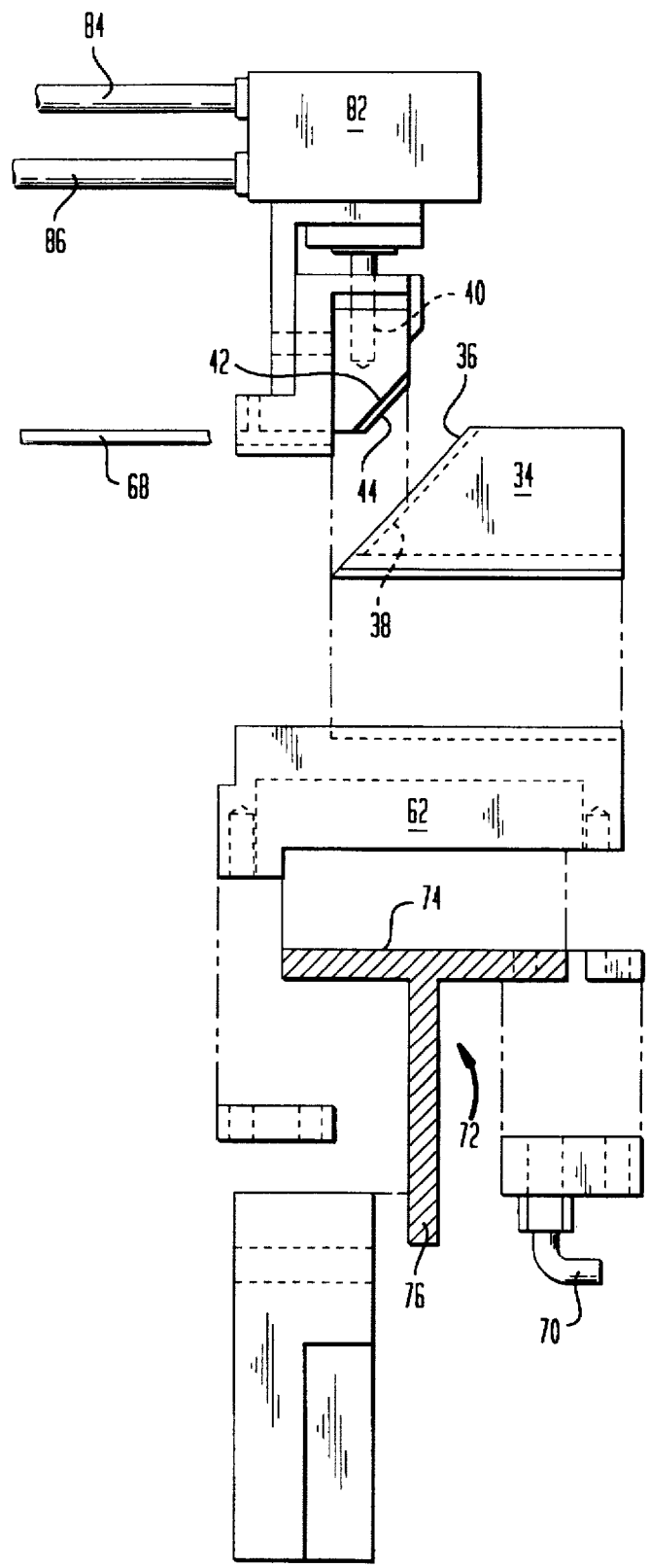
FIG. 4 is an exploded side view of the centerless grinder assembly shown in FIG. 3.
Figure 5:
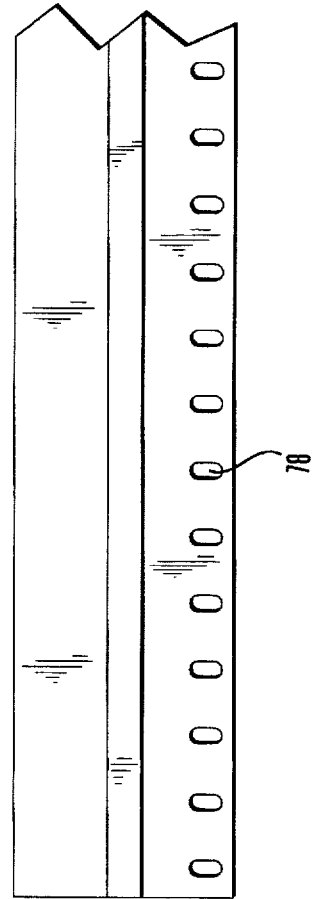
FIG. 5 is a bottom plan view of a T-bar on which the slidable sensor bank of the present centerless grinder is mounted.

As shown in FIGS. 3A, 3B and 4, the photoelectric sensors 68 are placed within the sensor bank assembly 28 through the rear side. Each photoelectric sensor 68 is arranged within a channel (unnumbered) and has an unobstructed path for detecting the rear end of the workpiece 48 as it is driven forward by the regulating wheel 18 along the passageway 68 of the sensor bank assembly 28.

With reference to FIG. 1, the sensor bank assembly 28 includes a forward end 30 and a rear end 28. The forward end 30 is arranged closer to the sizing feature of the work wheel 16 and the regulating wheel 18 than the rear end 32. Thus, the marking indicia 80 arranged near the rear end 32 of the sensor bank assembly 28 represents a greater distance from the sizing feature than the marking indicia 80 arranged closer to the front end 30 of the sensor bank assembly 28.

As also shown in FIG. 1, various components other than the slidable sensor bank assembly 28 may be arranged on the T-shaped track 72. In a preferred embodiment, these additional components are also slidable along the top section 74 of the T-shaped track 72 upon appropriate adjustment thereof. In particular, a wire guide 30 is arranged between the front end 30 of the slidable sensor bank assembly 28 and the grinding wheel 16. A bi-directional wire feeder and unloader 92 is shown in FIG. 1 between the front end 30 of the sensor bank assembly 28 and the adjustable wire guide 90. The bi-directional wire feeder and unloader 92 may include a pinch roller assembly coupled with a drive mechanism for driving the pinch rollers. This aspect of the present invention is known in the centerless grinder art and has been used by Royal Master Grinders, Inc. in various prior art centerless grinders.

The function of the bi-directional wire feeder and unloader 92 is to bring the front end 30 of the workpiece 48 to the regulating wheel 18 at the start of the machining process and to then feed the completed workpiece 48 back through the rear end 32 of the sensor bank assembly 28 so that it can be unloaded after the machining process has been completed.

A second pinch roller assembly 94 for unloading machined workpieces 48 can also be slidably arranged on the T-shaped track 72 near the rear end 32 of the slidable sensor bank assembly 28.

A venturi wire unloader 96 is closely spaced from the pinch roller assembly 94 near the rear end 32 of the sensor bank assembly 28 for facilitating the removal of the completed workpiece 48. The venturi wire unloader 96 is connected to an unloader tube 98 through which the workpiece 48 will be transported after the machining operations has been completed.

Various types of support mechanisms (not shown) may be employed to support the T-shaped track 72 and the slidable sensor bank assembly 28 arranged thereon.

Figure 7:
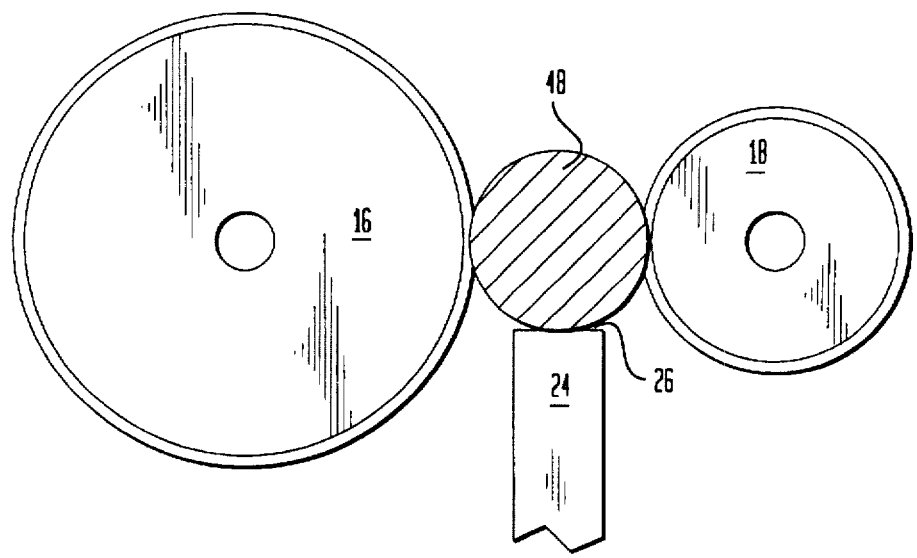
FIG. 7 is a schematic side view of selected components of the centerless grinder assembly of the present invention.

A wire 48 which has been machined to a desired configuration is shown in FIGS. 7 and 8 in a position between the work wheel 16 and the regulating wheel 18. The completed profile includes a first substantially constant small diameter section 50 at the forward most end of the wire. A relatively short tapered section 52 is arranged at the immediate distal location to the constant small diameter section 50. An intermediate constant diameter section 54 is formed in the central region of the wire 48. The completed wire 48 also includes a second tapered section 56 and a relatively constant large diameter section 58 at the rear end. The present centerless grinder 10 can be used to grind cylindrical parts having numerous diameters and tapered sections. The completed workpieces can be manufactured to extremely precise tolerances and may be provided with low microfinishes. Various accurate profiles may be obtained.

As illustrated in FIG. 8, the work wheel 16 and the regulating wheel 18 have angled surfaces which enable the workpiece 48 to be precisely machined in accordance with the desired configuration. The regulating wheel 18 is preferably arranged at a slightly offset angle with respect to a vertical plane (not shown). The offset relationship of the regulating wheel 18 with respect to the vertical plane is known in the art and permits the regulating wheel 18 to draw the workpiece 48 past the work wheel 16 while continuously spinning the workpiece 48. As is known in the art, the vertical component of the regulating wheel orientation is primarily responsible for causing the workpiece 48 to spin while the horizontal component of the regulating wheel orientation is primarily responsible for drawing the workpiece 48 past the work wheel 16. Although the operation speeds of the regulating wheel 18 and the work wheel 16 may vary, the regulating wheel 18 typically rotates at speeds between 50–100 RPM while the work wheel 16 typically rotates at speeds about 2000–2500 RPM.

FIG. 7 illustrates the workpiece 48 as it is supported on a work rest blade 24. The work rest blade 24 includes a top support surface 26 which may be arranged at an offset angle with respect to a horizontal plane. The orientation of the support surface 26 of the work rest blade 24 may vary depending upon the desired configuration of the workpiece 48. The work rest blade 24 supports the workpiece 48 during the entire grinding process and permits the workpiece 48 to freely rotate on its top support surface 26 during the machining process.

In accordance with a preferred method of operating the present centerless grinder assembly 10, the ideal dimensions and configuration of a perfectly machined workpiece are entered into the memory of the computer system 12. A workpiece 48 is then placed within the passageway 46 of the sensor bank assembly 28 and is drawn toward the work wheel 16 by the front pinch roller assembly 90. The regulating wheel 18 eventually grabs hold of the workpiece 48 and begins to draw the workpiece 48 through the passageway 46 and past the work wheel 16.

The photoelectric sensors 68 continuously detect the trailing end of the workpiece 48 as it passes the sensors. Signals are generated by the photoelectric sensors 68 which correspond to the passage of the trailing end of the workpiece 48. The signals are then processed by the computer system 12, and computer system 12 transmits corresponding control signals to the size control stepper or servo motor 20 of the regulating wheel 18. The size control stepper or servo motor 20 actuates a lead screw 22 to cause the regulating wheel 18 to move toward or away from the work wheel 16 depending upon the amount of stock to be removed from the workpiece 48.

After the workpiece 48 has been machined to its desired configuration, the front pinch roller assembly 90 is activated to grab the workpiece 48 and feed it toward the rear end 32 of the sensor bank assembly 28. The completed workpiece 48 is then grabbed by the pinch roller assembly 94 located near the rear end of the sensor bank assembly 28 which feeds the workpiece 48 through the venturi unloader 96 and into the unloader tube 98 which delivers the completed workpiece 48 to a receiving tray.

In order to determine the accuracy of the dimensions and profile of the workpiece 48 after grinding is completed, the workpiece 48 is fed through a gauging device which may be arranged within the pinch roller assembly 94.

Alternatively, the gauging device may be arranged between the pinch roller assembly 94 and the venturi unloader 96 or at various other locations. The gauging device accurately measures the dimensions of the entire profile of the completed workpiece 48. The information obtained by the gauging device is electrically transmitted to the computer system 12 and is compared to the ideal dimensions of the completed workpiece which were entered into the computer memory prior to initiation of the machining process. The computer system 12 will detect any deviation between the configuration of the completed workpiece 48 and the ideal configuration which it retains in its memory. These dimensional differences can vary with respect to the constant diameter sections 50, 54 and 58, and the tapered sections 52 and 56 of the workpiece 48.

In a preferred embodiment of the present invention, workpiece 48 is automatically fed through the gauging device after grinding operations have been completed. Further, in alternative embodiments, the workpiece 48 may be manually placed in the gauging device. In the manual embodiment, the gauging device may be remotely arranged with respect to the sensor bank assembly 28. However, the gauging device will preferably remain electrically connected to the computer system 12 so that the dimensions of the workpiece profile, which have been measured by the gauging device, are electrically transmitted to the computer system 12 as discussed above. In yet another embodiment, the gauging device may not be electrically connected to the computer system. To this end, the measured dimensions may be manually inputted into the computer by a keyboard, or the like.

One gauging device which is suitable for use with the present invention is presently manufactured by Royal Master Grinders, Inc., the assignee hereof, and is commercially available as Royal Master Grinders Model No. SA910. Such a gauging device utilizes a transducer to measure the diameter of the workpiece. The transducer may be a pneumatically actuated LVDT (linear variable differential transformer) having a sufficient stroke to clear the workpiece 48 and sufficient accuracy and repeatability to assure diameter measurements within desired tolerances. Royal Master Grinders Model No. SA910 gauging device utilizes an LVDT with low force actuation and sufficient stroke (±0.10 inch) and accuracy (0.00005 inch) or better.

This gauging device creates an electronic signal proportional to the transducer position. A special tip is provided that works in cooperation with a matching anvil so that the wire surface and shape is not altered or damaged during gauging operations.

The aforementioned gauging device is particularly useful to detect the profile and dimensions of a workpiece 48 when the workpiece is manually placed within the gauging device. To this end, the workpiece 48 is attached to a linearly moving element which causes an electrical signal to be generated according to the workpiece position. Thus, the diameter and length of the workpiece are continuously referenced to each other as its profile is accurately determined.

Other means to measure the workpiece diameter to best determine its profile may include a non-contact device such as a laser micrometer which generates a usable electronic signal which can be processed by an appropriate algorithm to compute the profile of an associated workpiece. As the present invention is not limited to a particular type of gauging device, it should be understood that various gauging devices which may include existing or future technology may be used to measure the dimensions of a workpiece.

Present means of moving the workpiece 48 in an embodiment where the gauging device is remote from the sensor bank assembly 28 includes a set of clips with a potentiometer which are assembled and mounted on a small platform. This platform assembly is slidable on a track which may be similar to the T-shaped track 72, and which is arranged in line with the means for measuring the workpiece diameter, such as the LVDT device. Other means of moving the workpiece 48 may be utilized such as linear stepper motors or rotary pinch rollers in conjunction with stepper motor or the like.

In order to compensate for differences in the constant diameter sections when the next workpiece is machined, the computer will direct the size control stepper or servo motor 20 to activate the lead screw 22 so that the regulating wheel 18 moves closer or further from the work wheel 16, or initiates such movements at a later or earlier time, when the next workpiece is machined. Thus, the sizing feature will be adjusted in an effort to obtain the ideal constant diameter parameters which were previously inputted into the memory of the computer system 12. In order to correct deviations between the actual tapered sections 52 and 56 and the ideal configuration of the tapered sections, the computer system 12 will send appropriate signals to the size control stepper or servo motor 20 to activate the lead screw 22 so that the regulating wheel 18 will be moved toward or away from the work wheel 16 at a faster or slower rate, or such that such movements begin at a later or earlier time, when the next workpiece is machined. The computer system 12 also may adjust, as a function of these differences, the assumed feed rate for the workpiece for executing the grinding profile.

As can be appreciated from the aforementioned discussion of the novel method of operating the centerless grinder assembly 10, the present system is a "smart system", as it creates workpieces having increasingly more accurate profiles as a result of learning of the minor variations in the profile of workpieces 48 with respect to the previously inputted ideal workpiece profile.

A further alternative method of operating a centerless grinder assembly will now be described with reference to FIG. 19 which schematically illustrates the workpiece 48 as it passes various photoelectric sensors 68 of the present centerless grinder assembly 10. The initial steps of this alternative method are similar to that discussed above. In particular, the ideal dimensions and configuration of a perfectly machined workpiece are first entered into the memory of a computer system 12. The workpiece 48 is then placed within the passageway 46 of the sensor bank assembly 28. The front pinch roller assembly 90 is then activated to feed the front end of the workpiece 48 toward the work wheel 16 and the regulating wheel 18. When the regulating wheel 18 eventually grabs hold of the workpiece 48, the front pinch roller assembly 90 will be deactivated and the regulating wheel 18 will draw the workpiece 48 through the passageway 46 and past the work wheel 16 to begin the grinding process.

Figure 19:
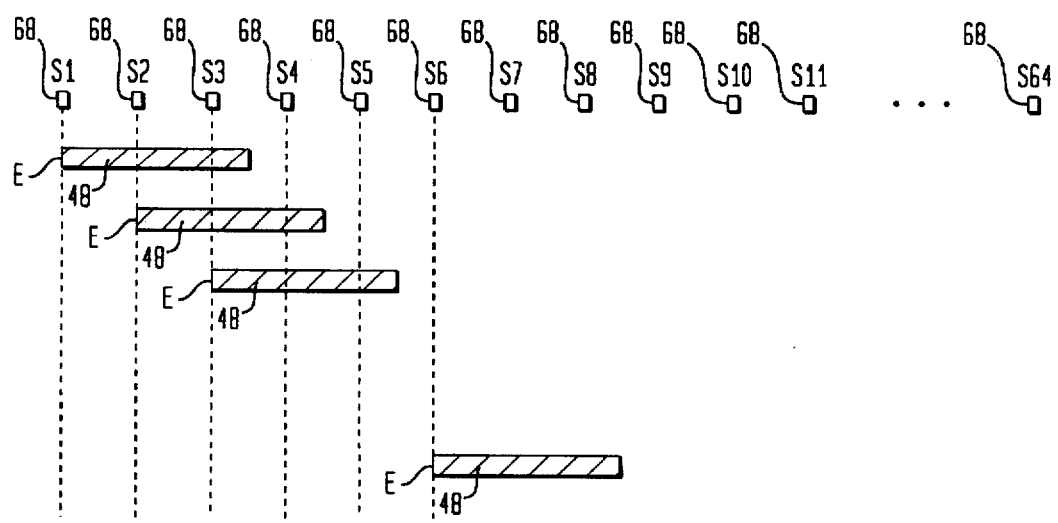
FIG. 19 is a schematic view illustrating movement of a workpiece past individual sensors in accordance with a method of operating the present centerless grinder assembly.

Referring to FIG. 19, the position of the trailing end E of the workpiece 48 is continuously monitored by the individual photoelectric sensors 68. For ease of reference, each of the photoelectric sensors 68 are separately identified in FIG. 19 by reference letters and numerals S1 through S64.

As discussed above, movement of the regulating wheel 18 will effect the profile of the workpiece 48. For example, as the regulating wheel 18 is moved toward the work wheel 16, additional stock is removed from the workpiece 48 during grinding operations. Conversely, as the regulating wheel 18 is moved away from the work wheel 16, less stock is removed from the workpiece 48. A tapered profile will be obtained when the sizing feature is modified during grinding operations by movement of the position of the regulating wheel 18 with respect to the work wheel 16.

As in Royal Master Grinders' prior art centerless grinder guide wire systems, and as in the preferred embodiments of the present invention discussed above, sensors (not shown) are placed in association with the regulating wheel 18 and the stepper motor 20 for providing signals to the computer system 12 to identify the position of the regulating wheel 18 with respect to the work wheel 16 during the grinding process. As discussed above, activation of the stepper motor 20 and the lead screw 22 will adjust the position of the regulating wheel 18 and the rate of movement thereof toward or away from the work wheel 16.

The feed rate (i.e., the velocity) at which the workpiece 48 will be drawn past the work wheel 16 by the regulating wheel 18 will preferably be an assumed calculated value when performing this alternative method of operating the present centerless grinder assembly 10. It should be appreciated, however, that the feed rate of the workpiece 48 can also be a measured value, and need not be an assumed calculated value. The velocity of the workpiece 48 will be based on various factors known in the art, such as the RPM's, tilt angle and diameter of the regulating wheel.

When an assumed calculated workpiece feed rate is used, it may be determined in accordance with the following equation:

$$V(\text{velocity of the workpiece}) = k \times D(\text{diameter of the regulating wheel}) \times RPM(\text{regulating wheel}) \times \tan \text{ of regulating wheel tilt angle.}$$

The parameter $k=k_o \times k_i$, where $k_o$ is a constant ($\Pi/60$) and $K_i$ is a slip variable related to variations in the feed rate of the workpiece under certain grinding conditions. For instance, $k_i$ may vary depending upon factors such as the diameter of the workpiece 48 prior to grinding, the instantaneous wire diameter during grinding, the shape of the template, the coefficient of friction of various components including the regulating wheel 16, the work wheel 18 and the work rest blade 24. A non-slip condition is obtained in an ideal environment so that $k_i=1$. Accordingly, an ideal value of $k=\Pi/60$. However, under actual conditions a slip variable will come into play. The slip variable $k_i$ will typically have a value of 0.60–200, although lower and higher slip variable values may exist. Thus, k will typically have a value between $(0.6 \Pi)/60$ abd $(2.0 \times \Pi)/60$. The feed rate (i.e., velocity) of the workpiece 48 may typically be about 1.1 inches/sec., although much lower or greater feed rates may be used. Such a typical feed rate will be obtained when the regulating wheel diameter D=6.0 inches, the regulating wheel RPM's=100 rev/min, and the regulating wheel tilt angle=2°.

As the trailing end E of the workpiece 48 continues to travel toward the regulating wheel 18 and the work wheel 16 along the X axis of the sensor bank assembly 28 (see FIG. 1) the position of the trailing end E will be detected by the successively arranged photoelectric sensors 68 (s1–S64) and electrical signals will be transmitted to the computer system 12 to be digitally processed. The position of the trailing end E of the workpiece 48 will be continuously monitored by the photoelectric sensors 68.

An internal clock (not shown) of the computer system is associated with the photoelectric sensors 68 for calculating an estimated, or actual, position of the trailing end E of the workpiece 48 along the path of travel. The internal clock may be initialized each time that the trailing end E of the workpiece 48 is detected by a sensor 68. When the trailing end E of the workpiece 48 is located between successive sensors 68, the computer system 12 will calculate the position of the trailing end E of the workpiece 48 based on the elapsed time of the internal clock and the known (either estimated, calculated or actual) feed rate of the workpiece.

For example, the position of the trailing end E of the workpiece 48 between sensor S1 and S2 is calculated by the computer which utilizes a formula to multiply the known feed rate of the workpiece 48 by the elapsed time that expired after the trailing end E was initially detected by sensor S1. The calculated position represents the position that the trailing end E of the workpiece 48 is spaced from the sizing feature when the calculation is performed. If an estimated feed rate is used, the calculated position will be an estimated position based on multiplication of the estimated feed rate and the elapsed time from detection of the trailing end E. In accordance with this aspect of the present invention, the originally estimated feed rate need not be recalculated at any time during machining operations.

The computer will continuously monitor the trailing end E of the workpiece 48 at a known interval, such as about every thirty milliseconds. This interval may vary substantially in alternative embodiments of the present invention. It should therefore be appreciated that the quantity of position calculations performed by the computer will vary in inverse proportion to the time of the sampling interval. This sampling interval will also be used to determine the frequency that position data detected by the sensors (not shown) associated with the regulating wheel will be transmitted to the computer to establish corresponding data regarding the position of the regulating wheel 18 with respect to the work wheel 16. Accordingly, the two sets of data (i.e., the data representing the distance between the trailing end E of the workpiece and the sizing feature, and the distance between the regulating wheel and the work wheel) are obtained at precisely the same time.

In addition to the ideal profile dimensions of the workpiece 48, which have been inputted into the computer memory, the computer is preprogrammed to include a formula, or a table (known as a "look-up table") which provides the position that the regulating wheel 18 should be at with respect to the work wheel 16 in order for the workpiece 48 to be machined to the desired profile when the trailing end E of the workpiece 48 is in a known location (i.e. a location at a known distance from the sizing feature).

The computer will continuously process each of the signals transmitted by the successive sensors 68 which represents the position of the trailing end E of the workpiece 48 with respect to the sizing feature. When a greater sample size is desired the computer will continuously calculate the position of a trailing end E of the workpiece 48 when it is located between successive sensors 68. To this end, the computer system 12 will calculate the position of the trailing end E of the workpiece 48 based on the elapsed time of the internal clock and the known feed rate of the workpiece. As discussed above, this calculation may be obtained by multiplying the known feed rate of the workpiece by the elapsed time that expired after the trailing end E was detected by the immediate preceding sensor 68. The computer will also continuously receive signals detected by the regulating wheel sensors which will provide information as to where the regulating wheel 18 is with respect to the work wheel 16 at a point in time that corresponds with a known position of the trailing end E of the workpiece 48 from the sizing feature. As discussed above, such continuous monitoring of the trailing end E of the workpiece 48 and the relative position of the regulating wheel 18 with respect to the work wheel 16 may occur at various selected intervals such as about every 30 milliseconds.

The computer will compare the data regarding the continuously detected position of the workpiece 48, and the measured regulating wheel position, to the proper location of the regulating wheel 18 as determined by the data of the look-up table. If the regulating wheel 18 is at an appropriate location with respect to the work wheel 16 to obtain the desired profile in accordance with the ideal workpiece profile dimensions which were previously inputted into the computer system memory, no compensation signals will be sent to the regulating wheel. However, if the computer determines that the position of the regulating wheel needs to be adjusted at a particular time in order to comply with the look-up table data, appropriate signals will automatically be sent to the stepper motor 20 by the computer to cause movement of the regulating wheel 18 toward or away from the work wheel 16 as quickly as possible.

As with the previously described preferred embodiment of the present invention, the workpiece 48 may be drawn through a gauging device after grinding operations have been completed. The gauging device will measure the actual dimensions of the workpiece profile. To this end, the workpiece 48 may be automatically or manually fed through the gauging device and the measured profile dimensions may be automatically or manually entered into the computer system 12. If differences exist between the actual dimensions of the ground workpiece 48 and the dimensions of the ideal workpiece profile as previously inputted into the computer memory, the formula, or the data in the look-up table, will be recalculated so that machining of the next workpiece will result in an overall profile that is closer to the ideal workpiece profile than the previously machined workpiece.

Alternatively, the assumed feed rate calculation may be modified to more closely approximate the actual feed rate so that an improved workpiece profile can be obtained. Still further, the feed rate of the workpiece 48 can be selectively increased or decreased during the next machining run so that the position of the trailing end E of the workpiece will correspond with the proper position of the regulating wheel 18 with respect to the work wheel 16 at selected points in time. If the feed rate of the workpiece is increased as discussed above, it may not be necessary to modify the look-up table to obtain an overall workpiece profile that approximates the ideal workpiece profile.

The aforementioned alternative method of operating the centerless grinder assembly 10 is therefore based on continuously monitoring the position of the trailing end E of the workpiece 48 by the fixed photoelectric sensors 68 and/or calculating the position of the trailing end E between successive sensors 68 based on a known feed rate and the interval clock values.

While the workpiece 48 is being machined, the next workpiece to be machined may be placed in a holding area 68 formed between the retainer bar 40 and the top section 34 of the sensor bank assembly 28. This aspect of the present invention is shown in FIGS. 1, 3A and 4. While the workpiece 48 is being machined by the work wheel 18 and the regulating wheel 16, it will be retained within the continuous passageway 46 formed between the retainer bar 40 and the top section 34 of the sensor bank assembly 28. At this time, the relationship between the closed passageway 46 and the workpiece 48 will appear as shown in FIG. 3A.

After the workpiece 48 has been machined to a desired configuration, it is drawn out of the passageway 48 as discussed above. At this time, the pneumatically controlled actuators 82 are activated to pull the retainer bar 40 to an open position with respect to the top section 34 of the sensor bank assembly 28 as shown in FIG. 3B. The next workpiece to be machined which was previously retained in the holding location 60 between the retainer bar 40 and the top section 34 of the sensor bank assembly 28 automatically falls into the passageway 48 when the retainer bar 40 is pulled to its opened position. The retainer bar 40 is then returned to a closed position to again form a precisely sized passageway 46 to retain the workpiece 48 during machining operations.

The slidable sensor bank assembly 28 of the present centerless grinder assembly 10 is particularly useful when an unusually long workpiece is to be machined. To this end, the slidable sensor bank assembly 28 can be quickly and precisely moved to a further location along the X axis with respect to the sizing feature. This can be accomplished by first adjusting the position of the venturi unloader 96 and the wire unloader pinch roller assembly 94. The locator pin 70 of the sensor bank assembly 28 should then be removed from its assembled position within one of the holes 78 in the top section 74 of the X axis of the T-shaped track 72. The sensor bank assembly 28 is then free to slide along the T-shaped track 72 until it is placed at a desired location where the photoelectric sensors 68 can continuously detect the trailing end of the workpiece during machining operations. It may be necessary to temporarily disconnect some or all of the photoelectric sensors 68 from the sensor bank assembly 28 or from an associated processing unit while the sensor bank assembly 28 slides to the desired final position on the T-shaped track 72. The photoelectric sensors 68 should then be reconnected as necessary. In a preferred embodiment however, it is not required to disconnect any of the photoelectric sensors 68 during movement of the sensor bank assembly 28.

In an alternative embodiment, the pinch roller assembly 94 and the venturi inloader 96 can be integral with the sensor bank assembly 28. In such an embodiment, removal of a single locator pin from an aligned hole in the T-shaped track will permit simultaneous slidable movement of the photoelectric sensors, the pinch roller assembly and the venturi unloader.

The present method of operating a centerless grinder assembly 10 provides various advantages over prior art methods. One such advantage is obtained through the WINDOWS based operating system which has been implemented to provide simple operating procedures through the general purpose computer system 12. FIGS. 9–18 illustrate ten preferred screens which can be accessed through the WINDOWS based operating systems of the present invention. These screens make the operating procedures user friendly so that an operator is unlikely to make an error.

The program for creating the customized user friendly screens shown in FIGS. 9–18 will be automatically loaded after an operator turns on the main power switch of the computer system 12. Information screens will be displayed indicating progress of the program as it is being loaded. After the loading procedure is completed, the main operating screen shown in FIG. 9 will automatically appear on the monitor.

The main operating screen functions as a cockpit and enables the operator to input essential information and access additional control screens. The operator can use a mouse or track ball to position the cursor over the desired control function. Typically, the left button on the mouse should be clicked to actuate a desired function after the cursor has been positioned.

The main operating screen shown in FIG. 9 will permit an operator to turn the grinder spindle on or off. The spindle state will be shown in the button window. The system hydraulics and the coolant can also be turned on or off by positioning the cursor and clicking at the appropriate button window shown in FIG. 9. The hydraulic and coolant flow state will also be shown in the appropriate button window. The coolant flow can also be turned to "grind" or "dress".

The grind cycle can be started or stopped at the completion of a cycle. The main operating screen also permits the operator to immediately abort the grind cycle with the "quick release" command. The state of the grind cycle is scrolled in the "cycle status" message window while the grind cycle is being performed. The information provided indicates the various cycle states such as "ready, feeding, grinding, diameter #1, 2, 3, etc., grinding taper #1, 2, 3, etc., clear unloading", and other grind cycle information.

The regulating wheel RPM's are monitored and displayed in the main operating screen. The main operating screen also permits other functions such as counters and "spindle load" to be adjusted.

The "Ram Position" is displayed in a bar form with the corresponding number of inches or millimeters representing the size of the gap between the wheels (the resulting part size). The up/down scroll arrows permit trim adjustment of the readout bar and corresponding number. This is a dynamic measurement.

The main operating screen also displays the "wire position" as inches or millimeters from the distal end of the wire. The wire position is also displayed with respect to the location of its trailing end within the eyebar (i.e., sensor bank). The sensor state of each individual sensor in the eyebar is also displayed. This information is useful to confirm the satisfactory operation of all of the photoelectric sensors 68.

The actual spindle load is displayed and the "trip point" can be set to stop the machining process immediately if conditions resulting in an increase in motor load should occur in excess of the set maximum load point.

The main operating screen also includes gauging counter controls which set the number of parts to be ground until gauging is required. The part count is displayed and when the preset number is reached, the automatic cycle goes on hold until the operator resets the function. The cycle counter control on the main operating screen permits an operator to set the number of parts which will be ground in a particular lot. The part count is displayed and when the preset number is reached, the automatic cycle goes on hold until the operator resets the function.

The WINDOWS menu bar located at the top of the main operating screen will permit the operator to select additional screens required to input or verify necessary information.

FIG. 10 illustrates the "wire specifications screen" which can be accessed by clicking on the "wire" entry of the menu bar located at the top of the main operating screen. After the wire specifications screen is displayed, the operator should click the mouse on the "part #" pull down arrow. The mouse should then be used to select a part from the list. Information for the selected part will be displayed in the various information boxes.

Various windows have spin dials and pull down menus. The spin dials are used to change a value such as diameter or length. Pull down menus are used to select a choice item or type a new choice from which to select.

New parts can be entered entirely or copied from existing selections and changed. They are assigned new numbers or names by typing in the appropriate window. Existing parts can be deleted from the choices with the "delete" button. The regulating wheel RPM speed can be entered. The RPM information is used in calculating the assumed wire speed.

Information in the wire specifications screen can be saved or aborted upon exiting back to the main operating screen.

The wire specifications screen permits an operator to access the "taper specifications screen" shown in FIG. 13. This can be accomplished by clicking on the "tapers" button. The taper specifications screen permits the operator to view the set parameters or change information about the workpiece tapers or profile shape. When the taper specifications screen displays appropriate information, the operator should click on the save/exit button. Once the operator exists the taper specifications screen, the wire specifications screen is again displayed before returning to the main operating screen.

Each tapered section has its own dedicated screen. For example, the diameter and length of the tapered sections 52 and 56 of the workpiece 48 has its own screen as shown in FIG. 13 for inputting required information to obtain the desired taper profile. The end diameter of tapered section 52 should be the same as the start diameter of tapered section 56.

As indicated on FIG. 13, the WINDOWS screen includes a prompt for the start and end diameters of a desired taper length. The start diameter of tapered section 56 cannot begin before the end diameter of tapered section 52. The operating program acknowledges this requirement and thus interacts between the screens.

The differential between the start and end diameters is computed by the program and is continuously displayed in a taper specifications screen as "diameter differential". This differential may be positive or negative depending on whether an increase or a decrease in diameter is desired.

As shown in FIG. 13, the taper specifications screen also includes prompts for inputting a start distance and the end distance of each particular taper, such as tapered sections 52 and 56. After the start and end taper distances have been inputted, the program will automatically calculate the taper length and will display such length on the taper specifications screen.

A taper number display indicates the taper number and has a spin wheel to change to an adjacent taper. The units may be optionally displayed in inches, millimeters or centimeters as set in the wire specifications screen. Each taper specifications screen has a button to abort or to save the data and to then exit to the wire specifications screen.

Figure 14:
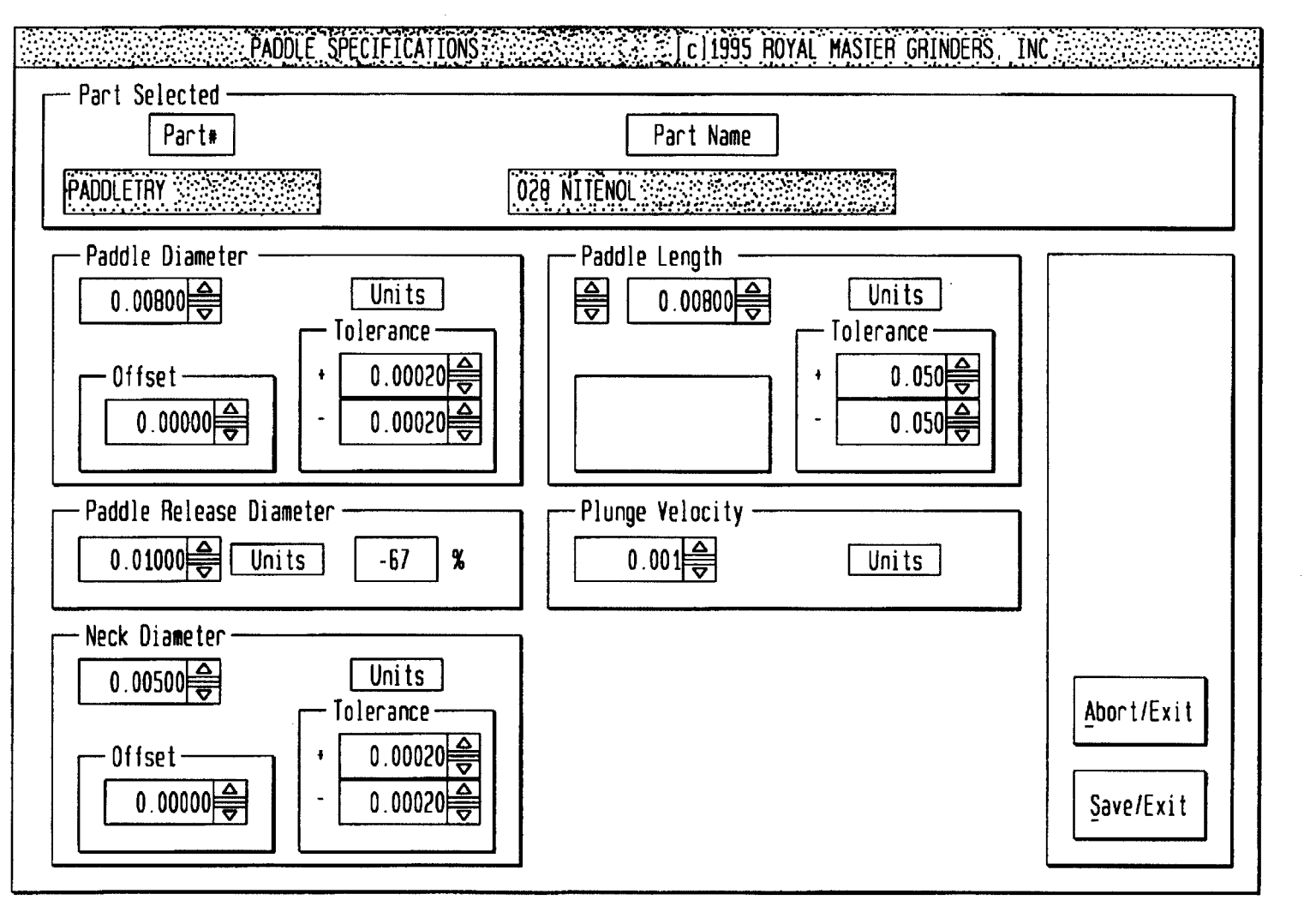

FIG. 14 illustrates the paddle specifications screen which includes prompts to receive and display information in a manner similar to the aforementioned discussion of the taper specifications screen. The paddle specifications screen has data windows and adjustment means such as spin wheels, fast and slow, etc. to adjust the values adjacent to the data.

The paddle specifications screen includes prompts for entering the paddle diameter and the neck diameter as well as a differential amount. Each of these values are independently entered. The differential is continuously computed and displayed. It is also adjustable and is connected to the two diameters so that the neck diameter may be adjusted according to the amount of the differential set.

A prompt is also provided for inputting the paddle length. This dimension is calculated from the outer edge of the work wheel 16. Each of the aforementioned dimensions has an offset value data window which can be set in accordance with desired tolerances.

A set point may be provided between the paddle diameter and the neck diameter at which point the paddle grinding retention unit is released just before the neck diameter is reached. This allows very small neck diameters to be ground without undercuts. The device allows linear motion of a workpiece to resume which is also a smooth transition to the neck diameter. The release point is expressed in terms of diameter as well as a percentage of the difference of the two diameters. The computation of this data also includes the offset of the diameters.

Panel specification units will be displayed in inches, millimeters or centimeters. Such units may be selected in the wire specifications screen. The paddle specifications screen of FIG. 14 also includes a button to abort or to save the data and to then exit to the wire specifications screen.

Figure 15:
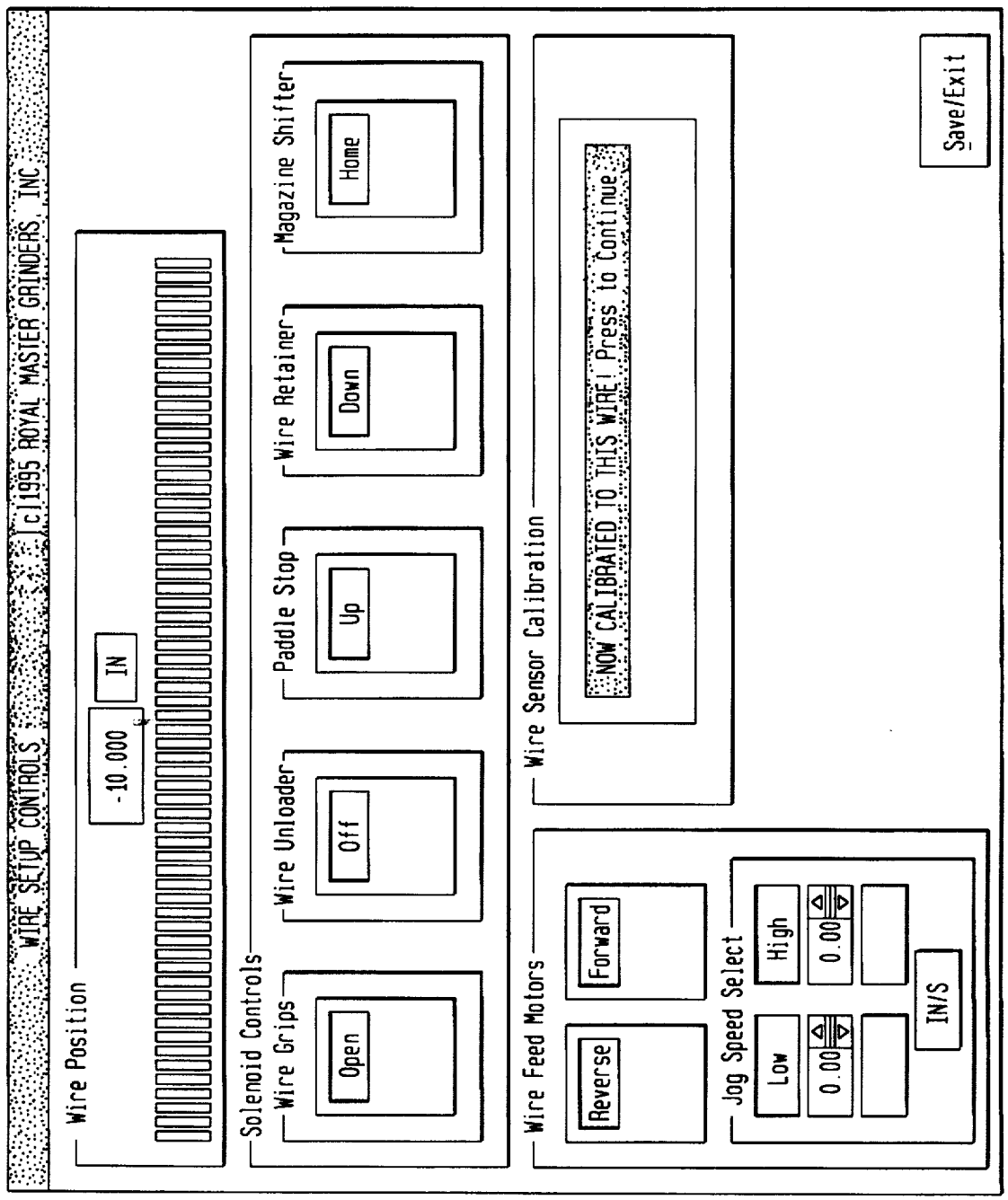
FIG. 15 is a wire set-up control screen created on a WINDOWS based operating system in accordance with a method of operating the present centerless grinder.

FIG. 15 illustrates a wire set-up control screen which displays the location of the trailing end of the workpiece 48 as a function of its position with respect to the plurality of sensors 68 of the sensor bank assembly 28. The wire set-up control screen allows the system operator to manually check all of the machine and loader functions. Solenoid control buttons are provided for permitting an operator to control movement of the retainer bar 40 between an open and a closed position. As discussed above, the retainer bar 40 is shown in its closed and opened positions in FIGS. 3A and 3B, respectively. Proper control over the retainer bar 40 is important to set the required dimensions of the passageway 46 between the top section 34 and the retainer bar 40 of the sensor bank assembly 28.

When the passageway 46 is empty (i.e., when no workpiece is arranged therein), a test workpiece is placed in the holding location 60 between the retainer bar 40 and the top section 34. The retainer bar 40 is then moved to the open position of FIG. 3B by clicking on the wire retainer button. The test workpiece will drop into the passageway 46 and the wire position indicator bar of the wire set-up control screen will change colors indicating that each of the photoelectric sensors 68 has detected the presence of the workpiece. The retainer bar 40 should then be moved to its closed position of FIG. 3A by clicking the appropriate button control.

Calibration of the sensor bank assembly 28 may be performed from the wire set-up control screen. For example, refer to FIG. 15. To this end, an operator should click on the Wire Sensor Calibration box and follow the prompts. The operator is prompted to place a wire in the holding location 60 between the retainer bar 40 and the top section 34 of the sensor bank assembly 28, and click again. The retainer bar 40 moves to an open position as shown in FIG. 3B and the wire workpiece 48 drops into the passageway 28. The operator observes that the red screen bar display changes to green, indicating that the individual sensors 68 are covered by the wire 48. The operator is further prompted to click again and the retainer bar 40 moves to a closed position as shown in FIG. 3A. The operator is then prompted to adjust the sensor bank assembly 28 so that the wire moves and spins freely by hand. With all sensors 68 covered, the operator is further prompted to click again indicating that this operation hs been performed, and all of the sensor assembly amplifiers are set to the calibrate mode. Each of the individual sensors 68 have yellow LEDs which light. The operator is prompted to remove the wire workpiece 48 from the sensor assembly 28 and click again, to indicate that this operation has been performed. The operator observes that the green screen bar display changes from green to red, indiciating that the individual sensors 68 are uncovered by the wire 48 and the amplifiers are then reset to normal. Each of the red LEDs associated with the individual sensors 68 are lit and the operator is prompted that the calibration procedure is completed.

The general procedure is to place a workpiece 48 within the passageway 68 as discussed above so that all of the photoelectric sensors 68 detect the presence of the workpiece 48. The operator should then click on the button which starts the amplifiers of the photoelectric sensors 68 to adjust the electronic gain of each and to simultaneously detect the presence of the workpiece 48. The workpiece 48 may then be removed from the passageway 46 of the sensor bank 28. When the operator clicks on the appropriate button, the amplifiers of the photoelectric sensor 68 will be simultaneously set to disregard any background object beyond the workpiece 48. This operating procedure is unique to the centerless grinding field.

The pinch roller assemblies 92 and 94 can be activated by clicking on the "wire grips" button. The feeder motors of the pinch roller assemblies 92 and 94 can then be operated to move the workpiece 48 along the x axis toward or away from the work wheel 16 and the regulating wheel 18 by clicking on the "reverse" or "forward" buttons which control the wire feed motors. The individual sensor indicators of the indicator bar at the top of the wire set-up controls screen will successive change colors to denote detection of workpiece movement by the photoelectric sensors 68 so that an operator can evaluate the performance of the individual, photoelectric sensors 68 as desired.

The unloader venturi 96 can also be controlled by clicking on the appropriate button of the wire set-up control screen.

Additionally, the operator may set the wire shifter by clicking on the appropriate button. The aforementioned functions are generally needed to set up a new installation check and to adjust various settings including the pneumatic connections of the control actuators 82, the flow valve settings, the dimensions of the passageway 46, and additional mechanical clearances.

When all desired functions have been performed, the operator can exit the wire set-up control screen by clicking on the save and exit button. The system would then return to the main operating screen of FIG. 9.

Figure 11:
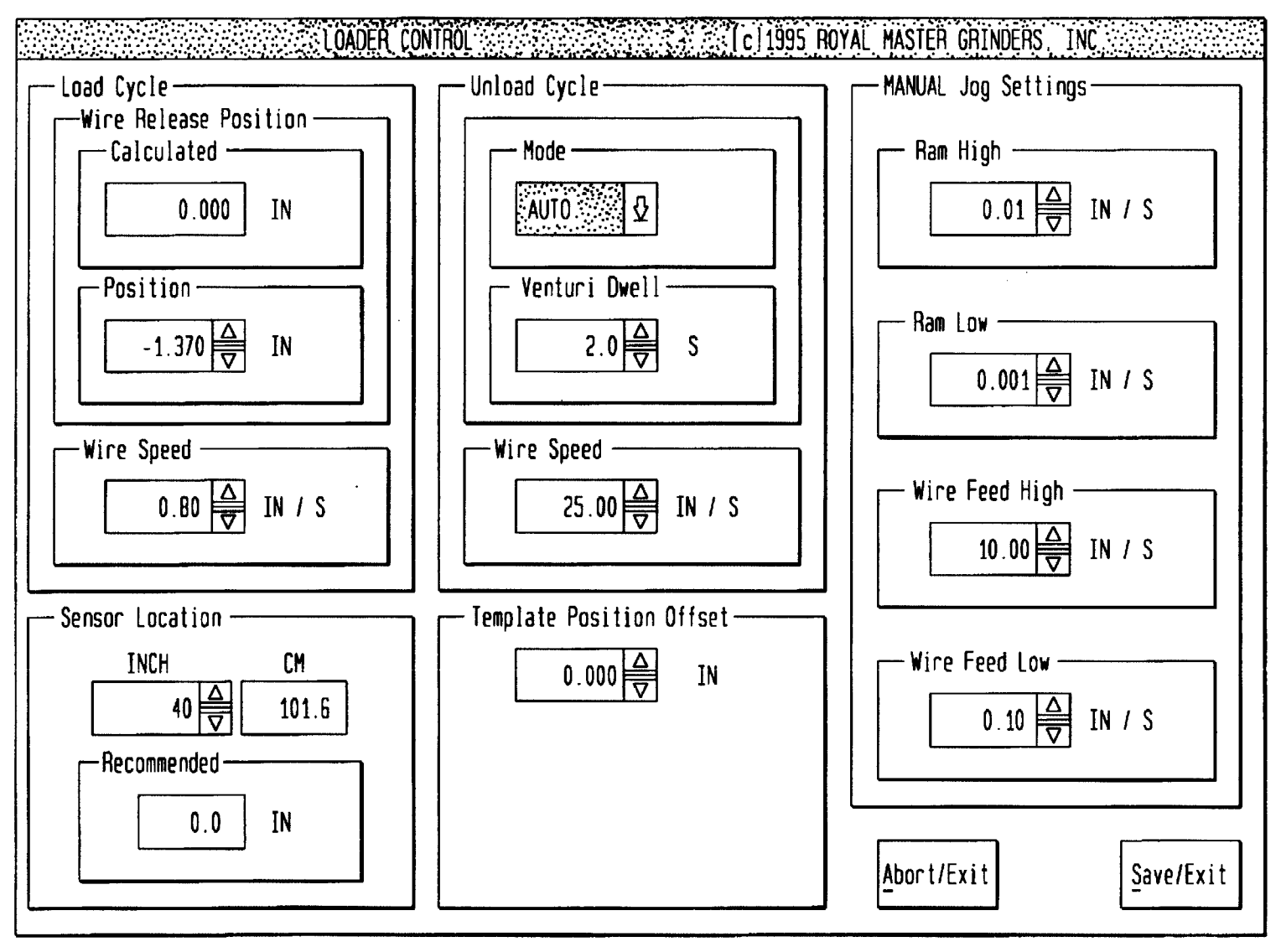

The operator may elect the loader control screen of FIG. 11 from the main menu bar of the main operating screen. The loader control screen will permit the operator to set the parameters that are associated with loading of a workpiece 48, unloading workpiece 48 after machining operations have been completed, setting of the location of the sensor bank 28, setting of the manual jog speed, and setting the offset of the wheel dressing template location.

The sensor bank location is set with the spin wheels. Preferably, the location data is displayed in both inches and centimeters. The operator may set this to the location of the locating pin 70. The program will automatically calculate and display the recommended location just below the actual set location. This will allow the operator to have some discretion in selecting the actual location, while providing the operator with guidance as to the recommended location.

During the wire loading cycle, the pinch roller assemblies feed the workpiece 48 at the set feed rate until the release position is reached. This is the point where the regulating wheel 18 will cause the workpiece 48 to spin and grinding by the work wheel 16 will commence. The computer will calculate the position of the workpiece 48 based on various information which may include the workpiece diameter, the tip or paddle diameter, and the angle of the dressing template used. Other information may be used by the computer to calculate the workpiece position.

The operator may select either an automatic or a manual unload cycle by clicking on the appropriate button of the loader control screen. If an automatic load cycle is selected, the operator may then select additional parameters including the wire feed speed and the venturi dwell time.

This will allow for complete passage of the workpiece 48 past the unloaded sensor before ending the cycle. If a manual load is selected, the operator will not be permitted to set certain data. This data will be "grayed" out visually on the loader control screen and should be ignored by the operator.

The manual jog values may also be set by the operator in this screen. The ram can be manually jogged—either fast or slow and displayed in inches per second or millimeters per second. These values are used at certain times during the automatic grinding cycle. The "wire feed high" and "wire feed low" settings are only needed in the manual mode.

The template offset window allows the operator to compensate all linear length dimensional data for the actual size features of the actual wheel configuration as a result of slight template deviations from the ideal design.

The data initially displayed in the loader control screen is loaded from the library of stored part numbers. If no information regarding the stored part numbers exists in the library, default data will be displayed. This data can be adjusted as described above. The operator may exit the loader control screen by clicking on the abort/exit button or by clicking on the save/exit button, which will save all of the data to a file associated with the part number selected. In either case, the system will return to the main operating screen.

Figure 12:
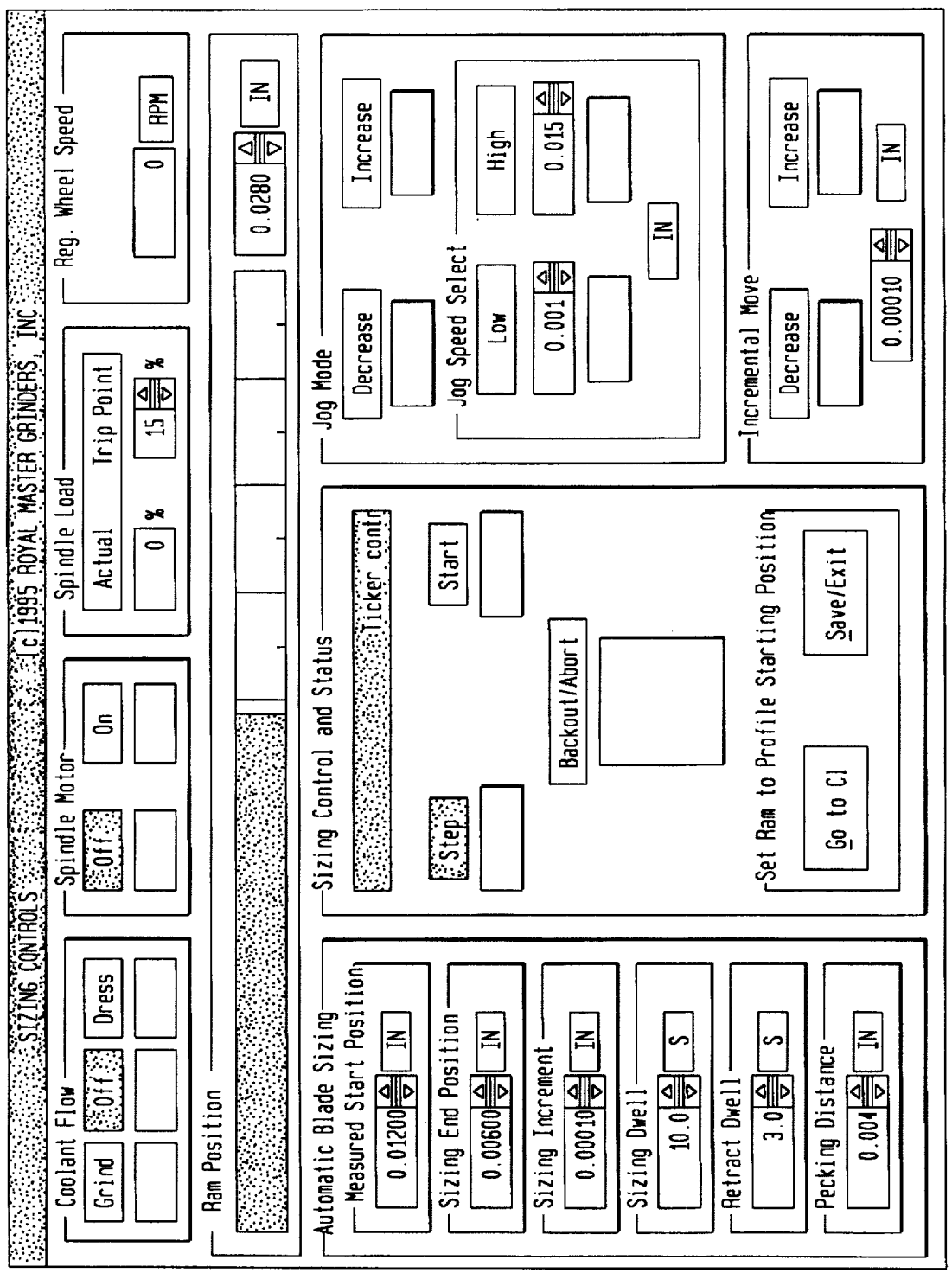
FIG. 12 is a sizing control screen created on a WINDOWS based operating system in accordance with a method of operating the present centerless grinder.

The operator may gain access to the "sizing control" screen by clicking on the sizing prompt from the main menu bar of the main control screen. The sizing control screen is shown in FIG. 12. The initial data displayed in the sizing control screen is loaded from the library of the part previously selected.

The top portion of the sizing control screen provides buttons for controlling the machine spindle motor and the coolant flow. The spindle load and trip point are displayed and set to the same values as set in the main operating screen. The regulating wheel speed (in RPMs) and the ram position is also displayed. The regulating wheel speed will be the same as the regulating wheel speed displayed in the main operating screen.

The jog mode area may be used by the operator to position the regulating wheel 18 in close proximity to the work rest support blade 24. Various speed values can be selected in terms of inches per second or millimeters per second.

The decrease and increase buttons displayed in the "incremental move" section of the sizing control screen will allow the operator to move the regulating wheel 18 as close to the work rest blade 24 desired. The incremental mode can be set for very accurate small amounts of motion such as 0.00010 inch.

Straps which connect the ram to the blade should be tightened after the desired sizing feature is obtained. The ram and the work rest blade 24 are then "jogged" together as a unit until they are in close proximity to the work wheel 16. The ram and the work rest blade 24 may then incrementally moved together as a unit until they touch the work wheel 16.

When the work rest blade 24 is ready for sizing, the coolant is turned on to "grind". During the sizing routine, the work rest blade 24 will advance into the work wheel 16. It will hold for a dwell time, and will then retract away from the work wheel by an amount set in the "pecking" distance. The pecking distance is the amount of retraction after the size dwell. This distance may be set to any positive value. A typical value is 0.005 inch.

The work rest blade 24 will then hold for a retract time, and will then repeat the process until it has reached a "size end" position.

A column of the data in the automatic blade sizing section allows the operator to set each of the above items individually. The sizing increments are selectable and may be set to very small or relatively large distance increments. The "sizing dwell" is the time for the work rest blade 24 to stay in contact with the work wheel 16. It is common to set the sizing dwell for about ten seconds. However, it can be set to a range of times at 0.1 second increments or smaller.

A WINDOWS screen may also be provided for calibrating transducers (not shown). Such a screen would provide an operator with a consistent and an accurate process to follow to assure that the ram transducer, which may be an LVDT, is calibrated to read and display the relative motion of the ram regulating wheel 18 with respect to the work wheel 16. Operator prompts may be provided on this screen in a consistent systematic manner.

The prompted procedure from this screen may direct the operator to set a micrometer in a particular way and then to input values into the computer system. Once the transducer is calibrated, this screen may provide means for clicking on an appropriate movement button to check the transducer calibration against the size control motor movement.

Figure 16:
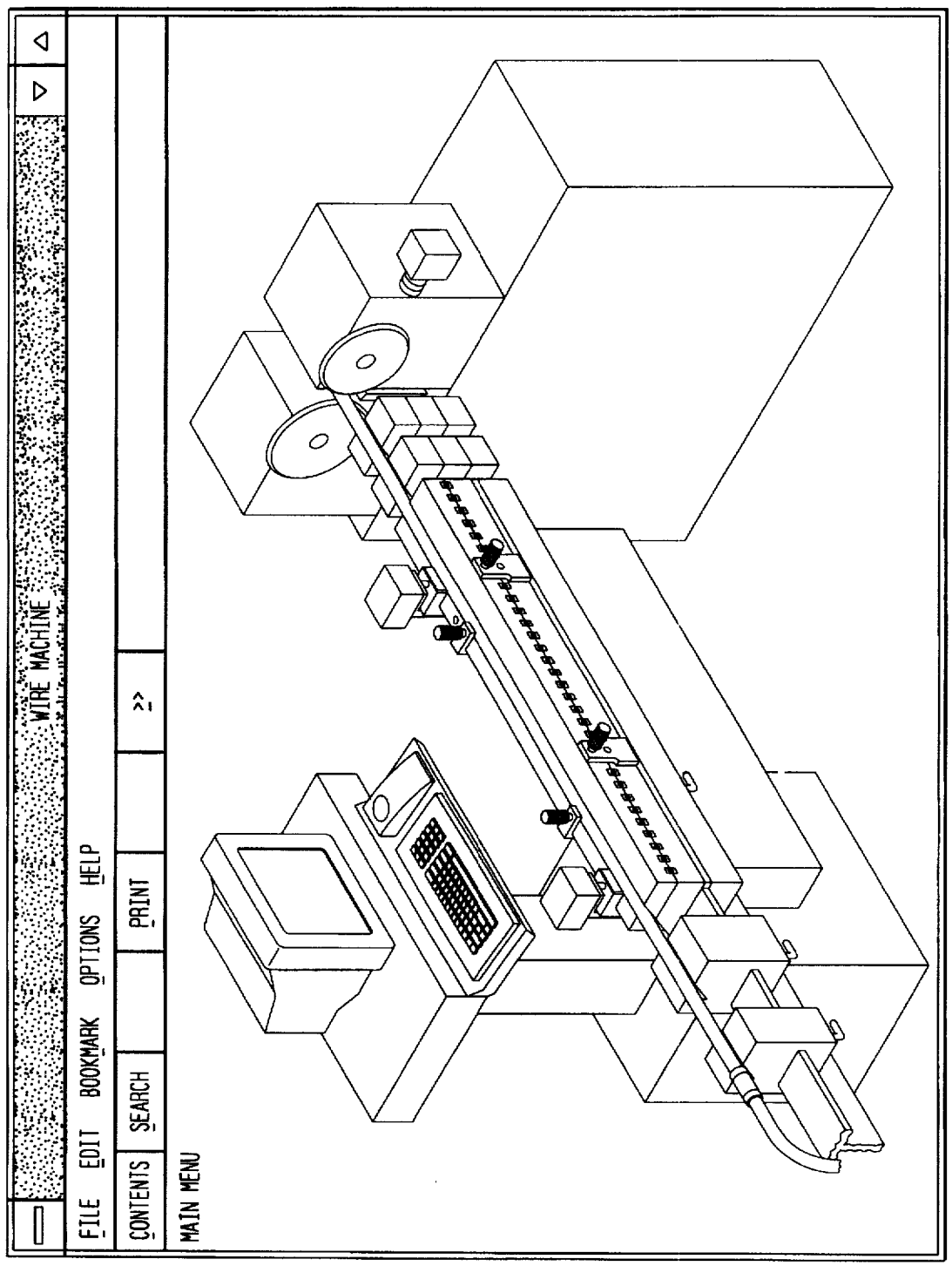
FIG. 16 is a main help screen created on a WINDOWS based operating system in accordance with a method of operating the present centerless grinder.
Figure 17:
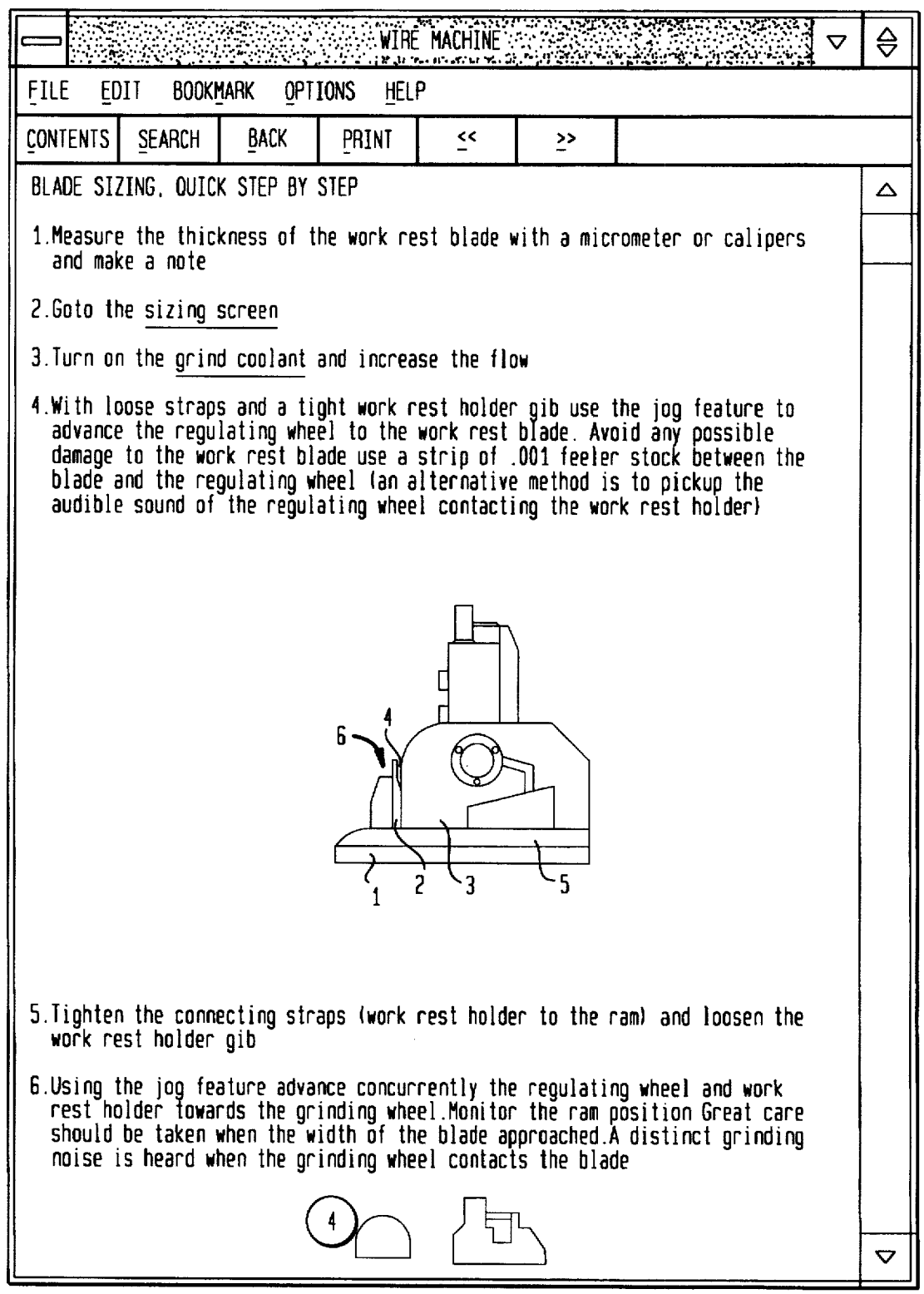
FIG. 17 is a blade sizing help screen created on a WINDOWS based operating system in accordance with a method of operating the present centerless grinder.

Numerous help screens, such as the main help screen of FIG. 16 and the blade sizing help screen of FIG. 17 may be included in the present program. These screens may be selected by clicking on the help prompt of the main menu bar from the main operating screen and then selecting particular help screens from the menu bar of the main help screen shown in FIG. 16.

The main help screen may depict an image of the overall centerless grinder assembly 10 including the various parts thereof as discussed above. The helpful information is organized with a table of contents and search paths to a specific subject or interest or need. Areas where information is directly available are indicated by the usual WINDOWS "hand" icon where the cursor is placed over an object. The operator can exit from the help screen by clicking on the "exit" button.

Figure 18:
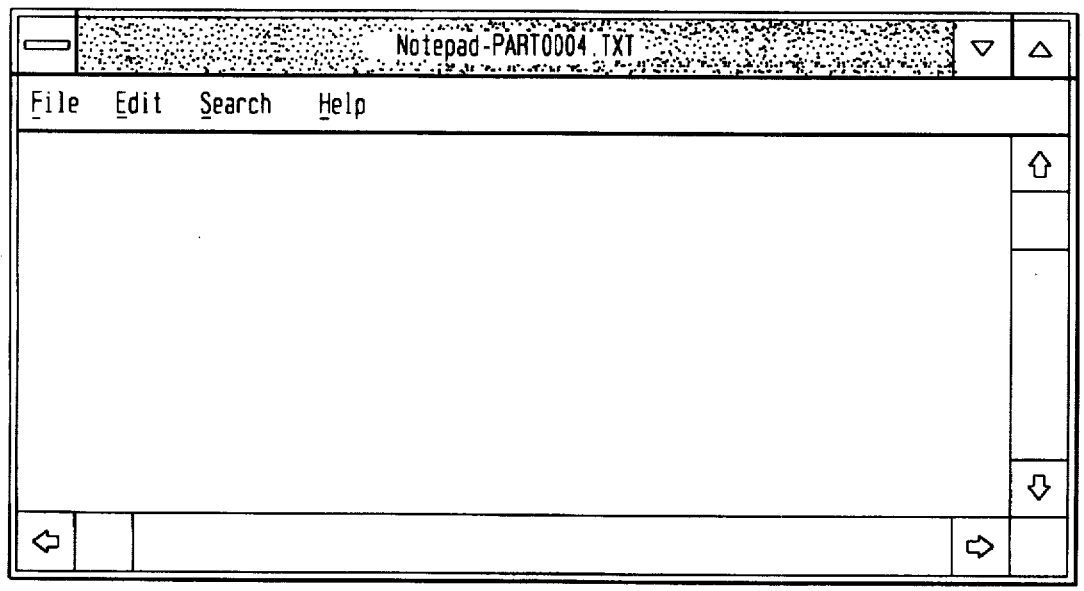
FIG. 18 is a note pad screen created on a WINDOWS based operating system in accordance with a method of operating the present centerless grinder.

A notepad screen is shown in FIG. 18 to provide the operator with an opportunity to take useful operating notes. The WINDOWS based operating system of the present invention provides a particularly user friendly environment to assist the operator in operating the present grinder assembly 10.

While the foregoing description and figures are directed toward preferred embodiments of the present invention, it should be appreciated that numerous modifications can be made to various features of the present centerless grinder assembly, and various steps in the methods set forth above while remaining within the scope and spirit of the present invention. Indeed, such modifications are encouraged to be made to the present centerless grinder assembly and methods of operating the same. Accordingly, the aforementioned detailed description of the present invention should be taken by way of illustration rather than by way of limitation as the present invention is defined by the claims set forth below.

I claim:

1. A method of operating a centerless grinder assembly comprising: determining the ideal profile dimensions of an elongate workpiece to be machined, said ideal profile having a non-uniform diameter along the length of said workpiece; inputting data representative of the ideal profile dimensions into a computer readable memory of the centerless grinder assembly; placing an elongate workpiece at a desired location on said centerless grinding assembly to be fed past a work wheel during machining operations; feeding said elongate workpiece past said work wheel of said centerless grinder assembly to obtain an actual machined workpiece profile, said actual machined workpiece profile having a non-uniform diameter along the length of said workpiece; continuously measuring the dimensions along the profile of the actual machined workpiece by feeding said machined workpiece through a gauging device; converting said measured workpiece profile dimensions into digital signals; transmitting said digital signals representative of said measured workpiece profile dimensions into a computer system of the centerless grinder assembly; calculating deviations between the ideal inputted workpiece dimensions and the measured workpiece dimensions; transmitting signals representative of the calculated deviations to means for modifying the profile of the next workpiece to be machined so that the profile dimensions of the next machined workpiece will be at least as close to said inputted ideal workpiece dimensions as the profile dimensions of the previously machined workpiece.

2. The method of claim 1 wherein said step of calculating deviations between the ideal inputted workpiece dimensions and the measured workpiece dimensions is performed by the computer system of the centerless grinder assembly.

3. The method of claim 1 wherein the means for modifying the profile of the next workpiece to be machined comprises a stepper motor in combination with a lead screw herein the transmitted signals are transmitted to said stepper motor which actuates the associated lead screw to move a regulating wheel either closer or further from the work wheel, or toward or further from the work wheel at a faster or slower rate than the previous machining operations so that precise profile dimensions can be obtained on the next elongate workpiece to be machined.

4. The method of claim 1 wherein the profile dimensions of the next machined workpiece are closer to said inputted ideal dimensions than were the profile dimensions of the previously machined workpiece.

5. A method of operating a centerless grinder assembly comprising the steps of: determining the ideal profile dimensions of an elongate workpiece to be machined; inputting data representative of the ideal profile dimensions into a computer readable memory of the centerless grinder assembly; placing an elongate workpiece having a trailing end at a desired location on said centerless grinder assembly to be fed past a plurality of sensors and a work wheel during machining operations; determining ideal position data including the desired position of the regulating wheel with respect to the work wheel of the centerless grinder assembly, and the corresponding position of the trailing end of said elongate workpiece with respect to said work wheel; inputting said ideal position data into the computer readable memory of said centerless grinder assembly; feeding said workpiece past said plurality of sensors and said work wheel at an assumed constant velocity to obtain an actual machined workpiece profile; continuously detecting the position of the trailing end of said workpiece with respect to said work wheel as it passes said plurality of sensors; converting the continuously detected position data into digital signals; transmitting said digital signals representative of the location of said trailing end of said workpiece with respect to said work wheel into the computer system of the centerless grinder assembly; continuously monitoring and detecting the actual position of said regulating wheel with respect to said work wheel in correspondence with the continuous detection of said trailing end of said workpiece; comparing the continuously detected position data of said trailing end of said workpiece and said regulating wheel with respect to said work wheel to the ideal position data to ascertain deviations therebetween; generating deviation signals representative of the deviation between said continuously detected and said ideal position data of said trailing end of said workpiece and said regulating wheel with respect to said work wheel; and transmitting said deviation signals to motor means for effecting movement of said regulating wheel whereby the relative positioning of said regulating wheel and said work wheel is adjusted so that said actual machined workpiece profile will improve.

6. The method of claim 5 further comprising the steps of measuring the dimensions along the profile of the actual machined workpiece; converting said measured workpiece profile dimensions into digital signals; transmitting said digital signals representative of said measured workpiece profile dimensions into the computer system; calculating deviations between the ideal inputted workpiece dimensions and the measured workpiece dimensions; and activating said motor means to cause corrective movements of said regulating wheel during machining of the next workpiece so that the profile dimensions of the next workpiece to be machined will be closer to the inputted ideal workpiece dimensions than the profile dimensions of the previously machined workpiece.

7. The method of claim 6 wherein said step of measuring the dimensions of the actual machined workpiece profile is performed by feeding said machined workpiece through a gauging device.

8. The method of claim 5 wherein said step of detecting the position of the trailing end of said workpiece is performed by photoelectric sensors electrically connected to said computer systems.

9. The method of claim 5 wherein said step of transmitting signals to said motor means comprises the step of transmitting signals to a stepper motor which actuates an associated lead screw to move said regulating wheel toward or away from said work wheel.

10. The method of claim 5 wherein said step of continuously detecting the position of said trailing end of said workpiece with respect to said work wheel comprises activating and initializing a clock each time said trailing end of said workpiece is detected by one of said plurality of sensors, and calculating the estimated position of said trailing end of said workpiece between successive ones of said plurality of sensors by multiplying the elapsed time of said clock by the known velocity of said workpiece.

* * * * *

UNITED STATES PATENT AND TRADEMARK OFFICE
CERTIFICATE OF CORRECTION

PATENT NO. : 5,746,644
DATED : May 5, 1998
INVENTOR(S) : Cheetham

It is certified that error appears in the above-indentified patent and that said Letters Patent is hereby corrected as shown below:

Column 2, line 52, "electively" should read --selectively--.

Column 25, line 1, "herein" should read --wherein--.

Signed and Sealed this

Twenty-first Day of July, 1998

Attest:

Attesting Officer

BRUCE LEHMAN

Commissioner of Patents and Trademarks